United States Patent
Kanazaki et al.

(10) Patent No.: US 11,925,918 B2
(45) Date of Patent: Mar. 12, 2024

(54) SILICA AGGREGATE, ADSORBENT, ADSORPTION COLUMN, CLEANING SYSTEM, METHOD FOR TREATING LIQUID, AND METHOD FOR PRODUCING SILICA AGGREGATE

(71) Applicant: CANON KABUSHIKI KAISHA, Tokyo (JP)

(72) Inventors: Kengo Kanazaki, Yokohama (JP); Fumio Yamauchi, Yokohama (JP); Teigo Sakakibara, Tokyo (JP); Yoshinori Kotani, Yokohama (JP); Ryoko Ueyama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 573 days.

(21) Appl. No.: 16/831,548

(22) Filed: Mar. 26, 2020

(65) Prior Publication Data
US 2020/0230573 A1    Jul. 23, 2020

Related U.S. Application Data

(63) Continuation of application No. PCT/JP2018/034573, filed on Sep. 19, 2018.

(30) Foreign Application Priority Data

Sep. 29, 2017 (JP) .................. 2017-192047

(51) Int. Cl.
*B01J 20/10* (2006.01)
*B01D 15/14* (2006.01)
(Continued)

(52) U.S. Cl.
CPC ............ *B01J 20/103* (2013.01); *B01D 15/14* (2013.01); *B01J 20/08* (2013.01); *B01J 20/24* (2013.01); *B01J 20/28007* (2013.01); *B01J 20/28016* (2013.01); *B01J 20/2803* (2013.01); *B01J 20/28052* (2013.01); *B01J 20/283* (2013.01); *B01J 20/286* (2013.01); *B01J 20/3028* (2013.01); *B01J 20/3085* (2013.01);
(Continued)

(58) Field of Classification Search
None
See application file for complete search history.

(56) References Cited

U.S. PATENT DOCUMENTS 4,910,084 A * 3/1990 Yamasaki ............ B41M 5/5245
                                                  525/353
5,260,064 A * 11/1993 Nakagawa ............ A61K 9/7061
                                                  424/443
(Continued)

FOREIGN PATENT DOCUMENTS

JP   2002-502684 A    1/2002
JP   2007-536190 A   12/2007
(Continued)

*Primary Examiner* — Colin W. Slifka
*Assistant Examiner* — Michael Forrest
(74) *Attorney, Agent, or Firm* — CANON U.S.A., INC. IP Division

(57) ABSTRACT

A silica aggregate includes primary silica particles aggregated, the primary silica particles having an average particle size of 1 nm or more and less than 10 nm, the primary silica particles being crosslinked to each other by a bond containing a siloxane bond.

2 Claims, 5 Drawing Sheets

(51) Int. Cl.
  *B01J 20/08* (2006.01)
  *B01J 20/24* (2006.01)
  *B01J 20/28* (2006.01)
  *B01J 20/283* (2006.01)
  *B01J 20/286* (2006.01)
  *B01J 20/30* (2006.01)
  *B09B 3/10* (2022.01)
  *B09B 101/30* (2022.01)
  *C01B 33/18* (2006.01)
  *C02F 1/28* (2023.01)
  *C02F 101/20* (2006.01)
  *C02F 103/08* (2006.01)
  *C22B 11/00* (2006.01)
  *G21F 9/12* (2006.01)

(52) U.S. Cl.
  CPC .......... *B09B 3/10* (2022.01); *C01B 33/18* (2013.01); *C02F 1/281* (2013.01); *C02F 1/286* (2013.01); *C02F 1/288* (2013.01); *C22B 11/042* (2013.01); *B01J 2220/52* (2013.01); *B01J 2220/58* (2013.01); *B09B 2101/30* (2022.01); *C01P 2004/50* (2013.01); *C01P 2004/61* (2013.01); *C01P 2004/64* (2013.01); *C02F 2101/20* (2013.01); *C02F 2103/08* (2013.01); *G21F 9/12* (2013.01)

(56) References Cited

U.S. PATENT DOCUMENTS

| | | | | |
|---|---|---|---|---|
| 6,335,037 | B1* | 1/2002 | Ichinohe | A61K 8/25 424/490 |
| 2002/0172827 | A1* | 11/2002 | O'Connor | C08K 9/04 428/403 |
| 2007/0122333 | A1* | 5/2007 | Yang | B01J 20/103 423/335 |
| 2010/0247914 | A1* | 9/2010 | Enomoto | A61K 8/25 428/402 |
| 2011/0266213 | A1* | 11/2011 | Jo | C04B 35/6264 977/777 |

FOREIGN PATENT DOCUMENTS

| | | |
|---|---|---|
| JP | 2008-86867 A | 4/2008 |
| JP | 2009-137806 A | 6/2009 |
| JP | 2009-254920 A | 11/2009 |
| JP | 2013-117450 A | 6/2013 |

\* cited by examiner

SILICA AGGREGATE, ADSORBENT, ADSORPTION COLUMN, CLEANING SYSTEM, METHOD FOR TREATING LIQUID, AND METHOD FOR PRODUCING SILICA AGGREGATE

CROSS-REFERENCE TO RELATED APPLICATIONS

This application is a Continuation of International Patent Application No. PCT/JP2018/034573, filed Sep. 19, 2018, which claims the benefit of Japanese Patent Application No. 2017-192047, filed Sep. 29, 2017, both of which are hereby incorporated by reference herein in their entirety.

BACKGROUND OF THE INVENTION

Field of the Invention

The present invention relates to a silica aggregate, an adsorbent, an adsorption column, a cleaning system, a method for treating a liquid, and a method for producing a silica aggregate.

Description of the Related Art

Solutions, such as liquid wastes, generated in nuclear power plants, mechanical and electronic industries, and other chemical industries can contain substances, such as heavy metals, precious metals, and ions thereof. These substances are desirably removed from solutions in view of environmental conservation and resource recycling.

For example, when nuclear fuel is melted or reused in nuclear power plants, liquid wastes containing, for example, radioactive and non-radioactive cesium (Cs), strontium (Sr), and ruthenium (Ru), are generated.

An example of methods for removing substances, such as Cs, Sr, and Ru, from liquid wastes is a method in which liquid waste is brought into contact with an adsorbent to adsorb and remove such a substance by the adsorbent. Zeolites are known as adsorbents for adsorbing Cs. Japanese Patent Application Laid-Open No. 2013-117450 discloses a method for removing radioactive Cs from an aqueous solution with a zeolite.

As described in Japanese Patent Application Laid-Open No. 2013-117450, when large amounts of unintended substances, such as other alkali metal compounds, are dissolved in liquid waste, the zeolite may adsorb large amounts of these substances to fail to sufficiently adsorb target substances. In Japanese Patent Application Laid-Open No. 2013-117450, after the zeolite adsorbs other alkali metals together with Cs, the zeolite is treated with water to elute the other alkali metals. Then the water-treated zeolite is brought into contact with the liquid waste again to adsorb Cs and the other alkali metals again. The adsorption and elution steps are repeated to increase the amount of Cs adsorbed on the zeolite even when impurities are present.

According to the method described in Japanese Patent Application Laid-Open No. 2013-117450, the amount of Cs adsorbed can be improved even in the presence of impurities. The zeolite, however, needs to be alternately brought into contact with the liquid waste and water. Thus, the operation and the configuration of the cleaning system tend to be complicated. In the method described in Japanese Patent Application Laid-Open No. 2013-117450, the amount of absorption is increased by repeating the steps of adsorption and elution. An adsorbent that can adsorb more target substances in one adsorption operation is preferable because the number of repetitions can be reduced.

That is, hitherto, there has been a demand for an adsorbent capable of adsorbing a target substance in a sufficiently high proportion from a liquid containing large amounts of impurities.

SUMMARY OF THE INVENTION

In view of the above problems, it is an object of the present invention to provide a silica aggregate that adsorbs a target substance in a high proportion from a liquid containing large amounts of impurities.

One disclosed aspect of the present invention is directed to providing a silica aggregate containing primary silica particles aggregated, the primary silica particles having an average particle size of 1 nm or more and less than 10 nm, the primary silica particles being crosslinked to each other by a bond containing a siloxane bond.

Further features of the present invention will become apparent from the following description of exemplary embodiments with reference to the attached drawings.

DESCRIPTION OF THE EMBODIMENTS

A silica aggregate according to an embodiment of the present invention will be described below with reference to the attached drawings. The present invention is not limited to the following embodiments. Various modifications and improvements of the following embodiments are also included in the scope of the present invention without departing from the spirit thereof on the basis of the usual knowledge of those skilled in the art.

Silica Aggregate

Figure 1A:
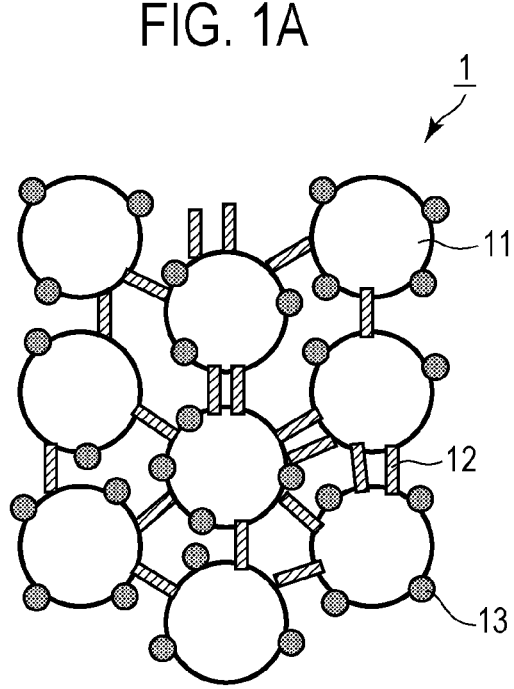
FIGS. 1A and 1B are schematic views of structures of a silica aggregate and a DNA-immobilized silica aggregate.
Figure 1B:
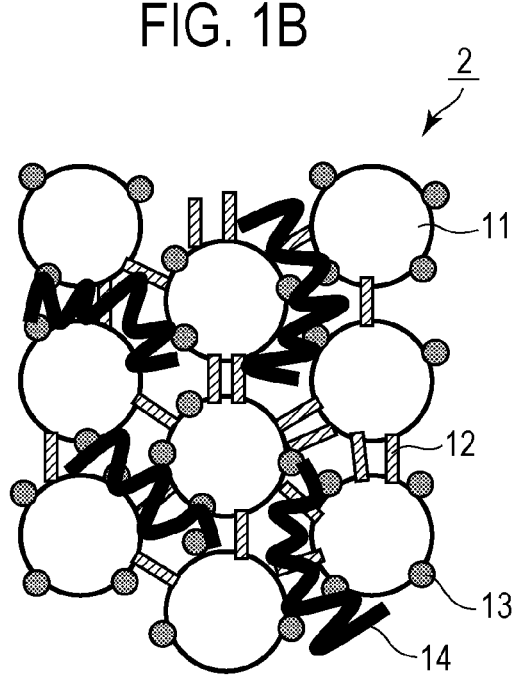

FIGS. 1A and 1B are schematic views of the structure of a silica aggregate according to an embodiment. Silica aggregates 1 according to the embodiment are formed of primary silica particles 11 aggregated. The primary silica particles 11 have an average particle size (diameter) of 1 nm or more and less than 10 nm. The primary silica particles 11 (primary silica particles) are crosslinked to each other by bonds 12 containing siloxane bonds. Each of the silica aggregates 1 preferably contains aluminum oxide 13 on at least a portion of a surface thereof. In each silica aggregate 1, the primary silica particles are preferably linked to form a three-dimensional network.

The silica aggregates 1 or DNA-immobilized silica aggregates 2 (described below) preferably have a number-average particle size of 10 μm or more. In this case, when the silica aggregates 1 are used as an adsorbent for an adsorption column, a cleaning system, or a method for treating a liquid, such as liquid waste or contaminated water, described below, it is possible to suppress the outflow of the silica aggregates 1 to the outside of the system while suppressing an increase in pressure loss during the passage of a liquid. As will be described in detail below, when the silica aggregates 1 are used for these applications, for example, a filter is used to prevent the outflow of the silica aggregates 1 on which a target substance to be removed is adsorbed to the outside of the system. The pore size of the filter needs to be selected in accordance with the particle size of the silica aggregates 1. A filter having a smaller pore size than the particle size of the silica aggregates 1 is preferably used. An extremely small pore size of the filter is not preferred because the pressure loss increases when the liquid flows through the filter. In this embodiment, the silica aggregates 1 have a large average particle size of 10 μm or more; thus, the filter for holding the silica aggregates 1 in the system can have a large pore size to suppress an increase in pressure loss during the passage of the liquid. The Ergun equation, which represents the relationship between the particle size of an adsorbent and pressure loss when a liquid passes through a column, also indicates that the silica aggregates 1 preferably have an average particle size of 10 μm or more in order to obtain the pressure loss to 1 MPa/m or less at a linear flow rate of 1 m/h. In the case where the silica aggregates 1 have a number-average particle size of 10 μm or more, the settling velocity of the silica aggregates 1 is increased in liquid waste or contaminated water; thus, solid-liquid separation in batch adsorption can be efficiently performed.

The silica aggregates 1 preferably have a number-average particle size of 2,000 μm or less. In this case, the specific surface area of the silica aggregates 1 can be increased and thus can efficiently adsorb a target substance to be removed.

The number-average particle size of the silica aggregates 1 or the DNA-immobilized silica aggregates 2 (described below) can be determined by measuring the equivalent circular diameters of the particles with a low-magnification microscope image and calculating the average thereof on a number basis. As the microscope image used here, an image captured with, for example, an optical microscope, a scanning electron microscope, or a transmission electron microscope can be used. The magnification is adjusted in such a manner that several tens to several hundreds of particles are observed in one field of view. The image is captured, and then the equivalent circular diameters of the particles are measured in the field of view. The above measurement may be performed in multiple fields of view to calculate the number-average particle size. If a statistically sufficient amount of particles are observed in one field of view, the number-average particle size may be calculated in the one field of view. The number-average particle size can be measured by, for example, a laser diffraction/scattering method, dynamic light scattering (DLS), or ultracentrifugation that measures a difference in settling velocity in accordance with particle size.

Primary Silica Particles

The primary silica particles 11 included in the silica aggregates 1 according to the embodiment contain silica. The primary silica particles 11 included in the silica aggregates 1 have an average particle size (diameter) of 1 nm or more and less than 10 nm. The primary silica particles 11 can also be referred to as silica nanoparticles or single silica nanoparticles.

Average Particle Size

The primary silica particles 11 included in the silica aggregates 1 have an average particle size of 1 nm or more and less than 10 nm, preferably 1 nm or more and less than 9 nm, more preferably 2 nm or more and 8 nm or less, particularly preferably 4 nm or more and 6 nm or less. The inventors have conducted studies and have found that the ability of the silica aggregates 1 to adsorb a target substance to be removed, such as metal ions, is significantly improved by reducing the average particle size of the primary silica particles 11 included in the silica aggregates 1 to less than 10 nm. The mechanism thereof is not clear, but the inventors speculate that this is because pores having a size suitable for adsorbing or holding, for example, metal ions are easily formed in the aggregates 1 in addition to increasing the specific surface area of the silica aggregates 1.

In the following description, a substance, such as an ion containing a metal element, adsorbed by the silica aggregates 1 or the DNA-immobilized silica aggregates 2 (described below) is referred to as a target substance to be removed. In this specification, the ion containing a metal element may be referred to as a metal ion. The target substance to be removed is preferably an ion containing at least one element selected from the group consisting of cesium (Cs), strontium (Sr), ruthenium (Ru), lead (Pb), cadmium (Cd), zinc (Zn), copper (Cu), iron (Fe), nickel (Ni), silver (Ag), rhodium (Rh), palladium (Pd), and iridium (Ir). The target substance to be removed may contain a radioactive element. The silica aggregates 1 according to the embodiment is preferably used for the adsorption of, in particular, ions containing cesium (Cs) or strontium (Sr), more preferably used for the adsorption of ions containing radioactive cesium or radioactive strontium.

The average particle size of the primary silica particles 11 included in the silica aggregates 1 can be measured by a method including measurement of the specific surface area of the silica aggregates 1. Specifically, the average particle size can be determined by measuring the specific surface area and the density of the silica aggregates 1 and performing calculation on the assumption that the primary silica particles 11 included in the silica aggregates 1 are spheres having a uniform particle size. A method for measuring the specific surface area of the silica aggregates 1 is not particularly limited. For example, a BET specific surface area measured by a gas adsorption method can be used as the specific surface area of the silica aggregate 1. A specific surface area measured by the Sears method (a method by titration with sodium hydroxide) may also be used as the specific surface area of the silica aggregates 1. As another method, the average particle size of the primary silica particles 11 may also be measured by observing the silica aggregates 1 with a microscope and measuring the size of each primary silica particle 11.

Preparation Method

The primary silica particles 11 can be synthesized by hydrolysis and polycondensation of an alkoxysilane. Specific examples of the alkoxysilane include compounds represented by $Si(OR)_4$, where R's may be the same or different and are each a lower alkyl group, such as a methyl group, an ethyl group, a propyl group, an isopropyl group, a butyl group, or an isobutyl group.

An example of a method for synthesizing the primary silica particles 11 by hydrolysis and polycondensation of the alkoxysilane will be described below. The alkoxysilane is dissolved in an organic solvent. Examples of the organic solvent include alcohols, such as methanol, ethanol, butanol, ethylene glycol, and ethylene glycol mono-n-propyl ether; various aliphatic and alicyclic hydrocarbons, such as n-hexane, n-octane, cyclohexane, cyclopentane, and cyclooctane; various aromatic hydrocarbons, such as toluene, xylene, and ethylbenzene; various esters, such as ethyl formate, ethyl acetate, n-butyl acetate, ethylene glycol monomethyl ether acetate, ethylene glycol monoethyl ether acetate, and ethylene glycol monobutyl ether acetate; various ketones, such as acetone, methyl ethyl ketone, methyl isobutyl ketone, and cyclohexanone; and various ethers, such as dimethoxyethane, tetrahydrofuran, dioxane, and diisopropyl ether. Among these, alcohols are preferably used in view of the stability of a solution to be prepared.

When an alkoxysilane solution is prepared, a catalyst and water that promote the hydrolysis and polycondensation reaction of the alkoxy groups may be added thereto, as needed. Examples of the catalyst include nitric acid, hydrochloric acid, sulfuric acid, phosphoric acid, acetic acid, and ammonia.

In the case where the primary silica particles 11 are obtained from the alkoxysilane, a solution of a metal alkoxide compound containing another metal element is separately prepared, mixed with the alkoxysilane solution, and subjected to hydrolysis and polycondensation, thereby incorporating the another metal element or another metal oxide into the primary silica particles 11.

As the primary silica particles 11, for example, commercially available colloidal silica can also be used. Specific examples of a commercially available colloidal solution containing colloidal silica dispersed therein include Snowtex NXS, Snowtex OXS, and Snowtex CXS (available from Nissan Chemical Corporation, "Snowtex" is a registered trademark of Nissan Chemical Corporation).

Each of the primary silica particles 11 preferably contains the aluminum oxide 13 on at least a portion of a surface thereof. In this case, when the primary silica particles 11 are aggregated to form the silica aggregates 1, stronger bonds can be formed between the primary silica particles 11 to improve the stability and strength of the silica aggregates 1. Additionally, the aluminum oxide 13 can also be disposed on a surface of each silica aggregate 1. The presence of the aluminum oxide 13 on at least a portion of the surface of each primary silica particle 11 enables adjustment of the charge state of the particle surface to, thereby improving the dispersion stability of the primary silica particles 11 in a dispersion.

Method for Forming Aggregate

The silica aggregates 1 according to the embodiment are aggregates in which the primary silica particles 11 are aggregated and can be prepared by aggregating the primary silica particles 11. An example of a method for aggregating the primary silica particles 11 is a method in which a dispersion of the primary silica particles 11 is prepared as a starting material and then a dispersion medium or a solvent is removed from the dispersion. In this case, a reduced-pressure drying method including drying treatment and a spray drying method can also be employed. The operation may be performed under heating conditions, as needed. Additionally, an aggregation method using another stimulus, such as a light stimulus, can also be employed.

The silica aggregates 1 according to the embodiment may be aggregates (what is called secondary particles) in which the primary silica particles 11 have been aggregated in advance. The silica aggregates 1 according to the embodiment may be aggregates (what is called tertiary particles) in which the aggregates (what is called secondary particles) obtained by aggregating the primary silica particles 11 in advance are further aggregated.

Bond Between Primary Silica Particles

In the silica aggregates 1 according to the embodiment, the primary silica particles 11 included in the silica aggregates 1 are cross-lined to each other by the bonds 12 containing siloxane bonds. The crosslinks between the primary silica particles 11 by the bonds 12 enables improvements in the stability and strength of the silica aggregates 1. In this specification, treatment to form crosslinks between the primary silica particles 11 by the bonds 12 is referred to as strengthening treatment. As a compound (crosslinking agent) used for the strengthening treatment, for example, an alkoxysilane, an organosilane, or a hydrolysate thereof can be suitably used. A solution containing the crosslinking agent is referred to as a strengthening treatment solution.

Examples of the alkoxysilane include tetramethoxysilane, tetraethoxysilane, and tetrapropoxysilane. Examples of the organosilane include methyltrimethoxysilane, methyltriethoxysilane, phenyltrimethoxysilane, phenyltriethoxysilane, and dimethyldimethoxysilane. Additionally, an oligomer prepared by crosslinking the alkoxysilane or organosilane can also be used.

As the strengthening treatment solution, two or more different strengthening treatment solutions can be used in combination, as needed. In other words, multiple crosslinking agents may be used.

As the strengthening treatment solution, a solution that gels due to a change in pH can also be used. Gelation indicates that the formation of the crosslinks between the primary particles is promoted by the addition of a component, such as an acid, an alkali, or a salt, having the effect of changing the pH. As the strengthening treatment solution to be gelled, a strengthening treatment solution containing an acidic component is particularly preferred. The acidic component refers to a component that reacts with, for example, alkali ions, alkaline-earth ions, or ammonium ions to form a salt. Specific examples thereof include ions, such as Cl—, $NO^{3-}$, $HSO^{4-}$, and $SO_4^{2-}$, free hydrochloric acid, nitric acid, sulfuric acid, acetic acid, and β-diketones. These acidic components can be used in combination of two or more, as needed. The pH is preferably in the range of 0 to 7, more preferably 1 to 6 during gelation.

Aluminum Oxide

Each of the silica aggregates 1 according to the embodiment preferably contains the aluminum oxide 13 on at least a portion of a surface thereof. The presence of the aluminum oxide 13 on at least a portion of the surface of each silica aggregate 1 enables the improvement of the ability of the silica aggregate 1 to adsorb a target substance to be removed, such as metal ions. The aluminum oxide 13 may cover a portion of the surface of each silica aggregate 1 or may cover the entire surface of each silica aggregate 1. The aluminum oxide 13 may be contained inside each silica aggregate 1 or may be present between the primary silica particles 11.

The silica aggregates 1 preferably have an aluminum oxide 13 content of 1% or more by mass, more preferably 3% or more by mass based on 100% by mass of the total silica contained in the silica aggregates 1. That is, the percentage by mass of the aluminum oxide 13 with respect to silica in the silica aggregates is preferably 1% or more by mass, more preferably 3% or more by mass. The upper limit of the aluminum oxide 13 content is not particularly limited and is preferably 20% or less by mass, more preferably 10% or less by mass. The use of an aluminum oxide 13 content of 1% or more by mass enables a further improvement of the ability of the silica aggregates 1 to adsorb a target substance to be removed, such as metal ions. The use of an aluminum oxide 13 content of 3% or more by mass enables a still further improvement of the adsorption ability.

DNA-Immobilized Silica Aggregate

The DNA-immobilized silica aggregates 2 in which DNA 14 is immobilized on the silica aggregates 1 serving as carriers will be described below. As illustrated in FIG. 1B, the DNA-immobilized silica aggregates 2 according to the embodiment include the silica aggregates 1 and the DNA 14 immobilized on the silica aggregates 1. As with the silica aggregates 1, the DNA-immobilized silica aggregates 2 according to the embodiment are suitably used to adsorb a target substance to be removed, such as metal ions, and are particularly suitably used to adsorb ions containing Cs, Sr, or Ru. The DNA-immobilized silica aggregates 2 are more suitably used to adsorb ions containing radioactive Cs, radioactive Sr, or radioactive Ru. In the following description, the DNA-immobilized silica aggregates may be simply referred to as DNA complexes. The DNA-immobilized silica aggregates 2 according to the embodiment may contain RNA molecules instead of the DNA 14. That is, nucleic acid-immobilized silica aggregates in which nucleic acid molecules are immobilized on the silica aggregates 1 serving as carriers may be used.

DNA

The type of the DNA 14 contained in the DNA-immobilized silica aggregates 2 may be, but is not particularly limited to, single- or double-stranded DNA. The double-stranded DNA has the advantage that an aromatic compound having a planar chemical structure, heavy metal ions, and so forth are selectively intercalated. The single-stranded DNA does not have hydrogen bonds formed between bases of complementary DNA strands in the double-stranded DNA; thus, amino groups and so forth of bases in the DNA are exposed. This promotes the interaction between the bases and metal ions and so forth. The ability to adsorb a substance, such as a metal ion, by complexation or the like can be seemingly increased as compared with double-stranded DNA. Thus, in the case where a metal ion or the like is a target substance to be removed, the DNA 14 is preferably single-stranded DNA. Part of the DNA 14 may be single-stranded DNA, and the remainder may be double-stranded DNA. That is, the DNA 14 may be a mixture of single-stranded DNA and double-stranded DNA. The DNA 14 preferably contains 80% or more by mass single-stranded DNA based on 100% by mass of the total DNA contained in the DNA-immobilized silica aggregates 2.

The single-stranded DNA content and the double-stranded DNA content with respect to the total DNA can be calculated by absorbance measurement. As another method, measurement can be performed with a commercially available evaluation kit, such as a PicoGreen dsDNA assay kit or an OliGreen ssDNA assay kit (available from Thermo Fisher Scientific Inc., "PicoGreen" and "OliGreen" are registered trademarks of Thermo Fisher Scientific Inc.) in accordance with the protocol.

Examples of the DNA 14 include DNA obtained from the testes and thymi of animals, such as mammals, birds, fish, and mollusks. In particular, DNA obtained from salmon, herring, or cod milt (testes), or the midgut gland (gonad) of scallop is preferred. Alternatively, DNA obtained from the thymi of mammals or birds, such as cows, pigs, or chickens, is preferred. The DNA 14 may be synthetic DNA, and its base sequence is not particularly limited. The DNA 14 may be synthetic DNA having a sequence, such as poly(dA) or poly(dT). As water-soluble forms thereof, alkali salts or ammonium salts are used. Alkali salts thereof are preferred. Sodium salts thereof are more preferred.

The DNA 14 preferably has an average molecular weight of 500,000 or less, more preferably 200,000 or less, even more preferably 100,000 or less, still even more preferably 80,000 or less, particularly preferably 50,000 or less. At an average molecular weight of the DNA 14 of 500,000 or less, the amount of the DNA 14 combined with the silica aggregates 1 is increased; thus, a larger amount of a target substance to be removed can be adsorbed.

The average molecular weight of the DNA 14 is an important factor for the immobilization of DNA in nano-sized gaps. For example, in the case where the DNA 14 has a molecular weight of 500,000, is single-stranded DNA, and is adsorbed on the surface of a carrier, the DNA 14 is estimated to have a size (radius of gyration) of about 15 nm. In the case of DNA having a size equal to or smaller than this size, it can be efficiently immobilized on the silica aggregates 1. Thus, the DNA 14 may preferably have an average molecular weight of 500,000 or less.

The use of the DNA 14 having an average molecular weight of 500,000 or less enables an increase in the solubility of the DNA 14 in water and a reduction in the viscosity of an aqueous solution of the DNA 14. In the case where the DNA-immobilized silica aggregates 2 are produced by a method including a step of bringing the aqueous solution of the DNA 14 into contact with the primary silica particles 11, the aqueous solution of the DNA 14 and the primary silica particles 11 are preferably mixed as uniformly as possible. An excessively high viscosity of the aqueous solution of the DNA 14 makes it difficult to prepare a uniform mixture to fail to sufficiently increase the amount of the DNA 14 in the DNA-immobilized silica aggregates 2. Furthermore, it is difficult to perform even the production of the DNA-immobilized silica aggregates 2, in some cases. Thus, the DNA 14 preferably has an average molecular weight of 500,000 or less.

The DNA-immobilized silica aggregates 2 preferably have a DNA 14 content of 1% or more by mass and 50% or less by mass, more preferably 3% or more by mass and 50% or less by mass, even more preferably 5% or more by mass and 50% or less by mass, particularly preferably 15% or more by mass and 50% or less by mass based on 100% by mass of the total the DNA-immobilized silica aggregates 2. The use of a DNA 14 content of 1% or more by mass enables adsorption of a larger amount of target substance to be removed. In particular, the adsorption ability originating from the DNA 14 is improved. For example, the ability to adsorb Ru-containing ions can be significantly improved.

A higher DNA 14 content of the DNA-immobilized silica aggregates 2 results in a larger adsorption amount of target substance to be removed and thus is more preferred. The use of a DNA 14 content of more than 15% by mass enables a significant increase in the adsorption amount of target substance to be removed. At a DNA 14 content of much more than 50% by mass, it is difficult to stably immobilize the DNA 14 on the silica aggregates 1, in some cases. Thus, the DNA 14 content is preferably 50% or less by mass.

The DNA 14 content of the DNA-immobilized silica aggregates 2 can be determined by an absorbance measurement method. A specific example thereof is a method in which the amount of DNA remaining in a solution without being immobilized on the silica aggregates 1 or the primary silica particles 11 at the time of production is measured by absorbance measurement. Alternatively, the amount of the DNA 14 can be measured by surface analysis using X-ray photoelectron spectroscopy (XPS).

The silica aggregates of the DNA-immobilized silica aggregates 2 may contain an organosiloxane on their surfaces, the organosiloxane containing a basic functional group or an epoxy group. The basic functional group refers to a nitrogen-containing functional group, typically an amino group, that can be combined with a phosphate group, which is an acidic functional group, in the DNA 14 to form an acid-base group structure. Because the silica aggregates contain the basic functional group, an ionic interaction of the basic functional group with the phosphate group in the DNA 14 can occur to form a covalent bond or noncovalent bond, thereby immobilizing the DNA 14. As the basic functional group of the silica aggregates, a secondary amino group, a tertiary amino group, or a quaternary amino group is preferred. In the case where the silica aggregates contain an epoxy group, a covalent bond can be formed with the base or a hydroxy group in the DNA 14 to immobilize the DNA 14.

An example of a method for introducing a basic functional group or an epoxy group to the surfaces of the silica aggregates is a method in which a silane compound having the functional group (hereinafter, also referred to as a "coupling agent") is hydrolyzed on a surface of the silica aggregates. The silane compound can form siloxane bonds with hydroxy groups present on the surfaces of the silica aggregates and thus can introduce the above functional group to the surfaces of the silica aggregates.

Specific examples of the silane compound having a basic functional group include the following compounds.

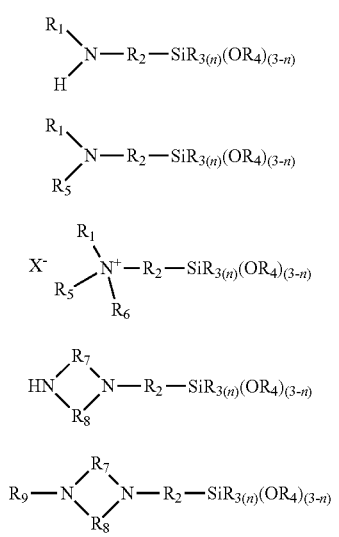

In each formula, $R_1$ is a hydrogen atom or a monovalent hydrocarbon group having 1 to 8 carbon atoms. $R_3$, $R_4$, $R_5$, $R_6$, and $R_9$ are each independently a monovalent hydrocarbon group having 1 to 8 carbon atoms. $R_7$ and $R_8$ are each independently a divalent hydrocarbon group. $R_2$ is a divalent hydrocarbon group having 1 to 8 carbon atoms or a divalent group containing —NH—.

In each of formulae (1) to (5), examples of the monovalent hydrocarbon group that has 1 to 8 carbon atoms and that is represented by $R_1$, $R_3$, $R_4$, $R_5$, $R_6$, or $R_9$ include linear, branched, and cyclic alkyl groups each having 1 to 8 carbon atoms, such as a methyl group, an ethyl group, a n-propyl group, an isopropyl group, a n-butyl group, an isobutyl group, a tert-butyl group, a n-pentyl group, a n-hexyl group, a n-heptyl group, and a n-octyl group; and aromatic hydrocarbon groups, such as a phenyl group. In each of formulae (1) to (5), examples of the divalent hydrocarbon group that has 1 to 8 carbon atoms and that is represented by $R_2$ include linear, branched, and cyclic divalent alkylene groups each having 1 to 8 carbon atoms, such as a methylene group, an ethylene group, a trimethylene group, and a tetramethylene group; and divalent aromatic hydrocarbon groups each having 1 to 8 carbon atoms, such as an o-phenylene group, a m-phenylene group, and a p-phenylene group. Examples of the divalent group containing —NH— include —NH— and groups each containing one or two divalent hydrocarbon groups, such as a methylene group, an ethylene group, a trimethylene group, and a tetramethylene group, bonded to a nitrogen atom. Specific examples thereof include —$C_2H_4NHC_3H_6$—, —$C_3H_6NHC_2H_4$—, —$CH_2NHC_3H_6$—, —$C_2H_4NHCH_2$—, —$C_2H_4NHC_2H_4$—, and —$C_3H_6NHC_3H_6$-(alkylene groups in these groups may be linear or branched). In each of formulae (4) and (5), the number of carbon atoms of each of the divalent hydrocarbon groups represented by $R_7$ and $R_8$ is not limited. Examples thereof include linear, branched, and cyclic divalent alkylene groups, such as a methylene group, an ethylene group, a trimethylene group, and a tetramethylene group; and divalent aromatic hydrocarbon groups, such as an o-phenylene group, a m-phenylene group, and a p-phenylene group. Specific examples thereof include a methylene group and an ethylene group. In formula (3), the anion represented by $X^-$ may be any anion that can form a counterion for a siloxane cation having a quaternary amino group. Examples thereof include halogen ions.

Specific examples of these silane compounds include $H_2NC_3H_6Si(OCH_3)_3$, $H_2NC_3H_6SiCH_3(OCH_3)_2$, $H_2NC_3H_6Si(OC_2H_5)_3$, $H_2NC_3H_6SiCH_3(OC_2H_5)_2$, $(CH_3)HNC_3H_6Si(OCH_3)_3$, $(CH_3)HNC_3H_6SiCH_3(OCH_3)_2$, $(CH_3)HNC_3H_6Si(OC_2H_5)_3$, $(CH_3)HNC_3H_6SiCH_3(OC_2H_5)_2$, $(CH_3)_2NC_3H_6Si(OCH_3)_3$, $(CH_3)_2NC_3H_6SiCH_3(OCH_3)_2$, $(CH_3)_2NC_3H_6Si(OC_2H_5)_3$, $(CH_3)_2NC_3H_6SiCH_3(OC_2H_5)_2$, $(C_2H_5)_2NC_3H_6Si(OCH_3)_3$, $(C_2H_5)_2NC_3H_6Si(OC_2H_5)_3$, $H_2NC_2H_4NHC_3H_6Si(OCH_3)_3$, $H_2NC_2H_4NHC_3H_6SiCH_3(OCH_3)_2$, $H_2NC_2H_4NHC_3H_6Si(OC_2H_5)_3$, $H_2NC_2H_4NHC_3H_6SiCH_3(OC_2H_5)_2$, $(CH_3)HNC_2H_4NHC_3H_6Si(OCH_3)_3$, $(CH_3)HNC_2H_4NHC_3H_6SiCH_3(OCH_3)_2$, $(CH_3)HNC_2H_4NHC_3H_6Si(OC_2H_5)_3$, $CH_3HNC_2H_4NHC_3H_6SiCH_3(OC_2H_5)_2$, $(CH_3)_2NC_2H_4NHC_3H_6Si(OCH_3)_3$, $(CH_3)_2NC_2H_4NHC_3H_6SiCH_3(OCH_3)_2$, $(CH_3)_2NC_2H_4NHC_3H_6Si(OC_2H_5)_3$, $(CH_3)_2NC_2H_4NHC_3H_6SiCH_3(OC_2H_5)_2$, $(CH_3)_3N^+C_3H_6Si(OCH_3)_3$, and $Cl^-(C_4H_9)_3N^+C_3H_6Si(OCH_3)_3$. At least one of them can be used.

In the case where the basic functional group is cyclic, specific examples of the coupling agent include the following compounds.

-continued

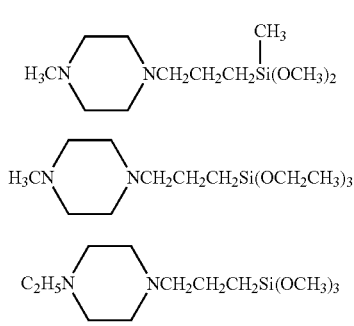

A specific example of the silane compound containing an epoxy group is 3-glycidoxypropyltrimethoxysilane. The silane compounds represented by formulae (6) to (12) may be alkoxy oligomers, which are condensates resulting from the partial hydrolysis thereof. Reactive sites that react with the silica aggregates are increased to stabilize bonds between the silane compound and the surfaces of the silica aggregates, thereby enabling a reliable immobilization of DNA. When the alkoxy oligomer of the compound represented by formula (9) is added to a DNA-containing colloidal silica solution, the alkoxy oligomer does not cause the destabilization (gelation) of the colloidal solution and thus is preferable as a silane compound containing a basic functional group. The basic functional group immobilizes DNA and can adsorb various metal elements. Thus, silane compounds containing various basic functional groups in accordance with target metals can be used.

Method for Producing Silica Aggregate and DNA-Immobilized Silica Aggregate

Figure 2:
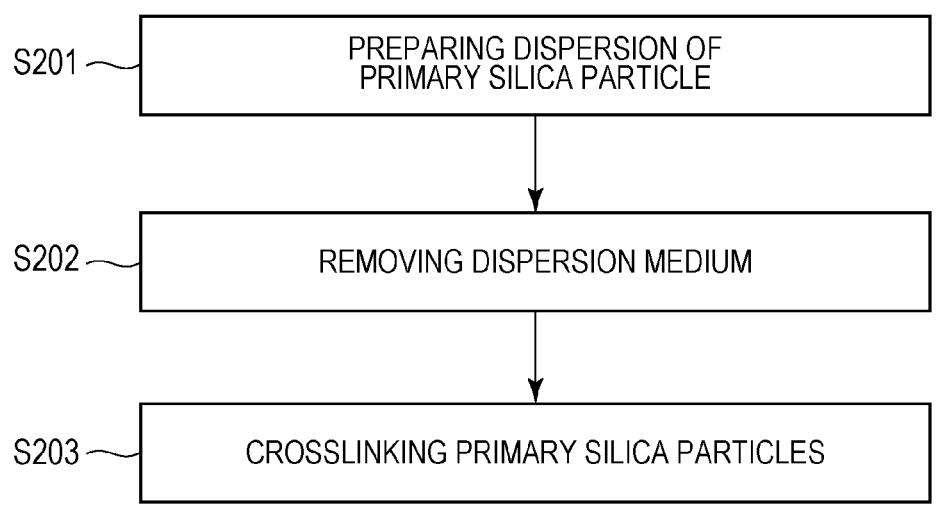
FIG. 2 is a flow chart of an example of a method for producing a silica aggregate and a DNA-immobilized silica aggregate.

An example of a method for producing the silica aggregates 1 and the DNA-immobilized silica aggregates 2 will be described below with reference to FIG. 2.

The method for producing the silica aggregates 1 according to the embodiment includes the following steps (1) to (3):
(1) a step of preparing a dispersion of primary silica particles having an average particle size of 1 nm or more and less than 10 nm;
(2) a step of removing a dispersion medium from the dispersion of the primary silica particles; and
(3) a step of crosslinking the primary silica particles.

Each of the steps will be described below.

(1) Step of Preparing Dispersion of Primary Silica Particles Having Average Particle Size of 1 nm or More and Less than 10 nm (S201)

In step S201, a dispersion of primary silica particles having an average particle size of 1 nm or more and less than 10 nm is prepared. As an example of this step, primary silica particles having an average particle size of 1 nm or more and less than 10 nm are dispersed in a dispersion medium, such as water. Alternatively, a commercially available dispersion of primary silica particles having an average particle size of 1 nm or more and less than 10 nm may be provided and then used in the subsequent step. The primary silica particles preferably contain aluminum oxide on at least a portion of a surface thereof. In the case where the primary silica particles do not contain aluminum oxide, aluminum oxide or an aluminum compound serving as a raw material to be formed into aluminum oxide is preferably dispersed or dissolved in the dispersion.

In step S201, the foregoing coupling agent may be added to the dispersion of the primary silica particles. In the case of producing the DNA-immobilized silica aggregates 2, DNA may be dissolved in the dispersion of the primary silica particles. In another method, a DNA solution is prepared, and then the primary silica particles may be dispersed in the DNA solution. A dispersion of the primary silica particles and a DNA solution may be mixed.

(2) Step of Removing Dispersion Medium from Dispersion of Primary Silica Particles (S202)

In step S202, a dispersion medium is removed from the dispersion prepared in step S201. A method for removing the dispersion medium is not particularly limited. Examples of the method that can be employed include a spray drying method and a reduced-pressure drying method. In the course of the removal of the dispersion medium in this step, the primary silica particles are aggregated or agglomerated to form aggregates.

After step S202, a step of washing the resulting aggregates with ion-exchanged water may be provided.

(3) Step of Crosslinking Primary Silica Particles (S203)

In step S203, the primary silica particles are crosslinked. A method for crosslinking the primary silica particles is not particularly limited. An example thereof is a method in which the aggregates obtained in step S202 are treated with the above strengthening treatment solution. In this case, the aggregates obtained in step S202 are dispersed in the strengthening treatment solution, and the resulting mixture is stirred. In the case where the coupling agent is added to the dispersion in step S201, the primary silica particles can be crosslinked by removing the dispersion medium in step S202. In this case, steps S202 and S203 are concurrently performed. Accordingly, steps S202 and S203 need not necessarily be performed in this order, may be performed simultaneously, or may be performed in the reverse order.

After step S203, a step of washing the resulting aggregates with ion-exchanged water may be provided. Then a step of drying the resulting aggregates may be provided.

As described above, in the case where the DNA-immobilized silica aggregates 2 are produced, a dispersion containing DNA and primary silica particles is prepared in step S201. That is, it can be said that a method for producing the DNA-immobilized silica aggregates 2 includes the following steps (1) to (4):
(1) a step of preparing a DNA solution;
(2) a step of bringing the DNA solution into contact with a dispersion of primary silica particles having an average particle size of 1 nm or more and less than 10 nm;
(3) a step of removing a dispersion medium from the mixture containing DNA and the primary silica particles; and
(4) a step of crosslinking the primary silica particles.

Adsorbent

The silica aggregates 1 or the DNA-immobilized silica aggregates 2 can be used as an adsorbent to adsorb a substance, such as a metal ion, in a liquid. The silica aggregates 1 or the DNA-immobilized silica aggregates 2 are suitable as an adsorbent for an ion containing at least one element selected from the group consisting of cesium, strontium, ruthenium, lead, cadmium, zinc, copper, iron, nickel, silver, rhodium, palladium, and iridium, in view of their adsorption ability. The silica aggregates 1 are particularly suitable as an adsorbent for an ion containing cesium, iridium, ruthenium, palladium, or strontium. The above elements may be radioactive elements. The silica aggregates 1 or the DNA-immobilized silica aggregates 2 are suitably used as an adsorbent for cleaning a liquid containing radioactive waste (radioactive liquid waste).

The silica aggregates 1 or the DNA-immobilized silica aggregates 2 may be used as an adsorbent as it is or may be subjected to adjustment of the particle size and the shape by granulation and shape forming before use as an adsorbent. An article in which the silica aggregates 1 or the DNA-immobilized silica aggregates 2 are immobilized on a base, such as a plate, fibers, a woven fabric, or a nonwoven fabric, may be used as an adsorbent. In the case of performing granulation, shape forming, or immobilization, a binder, such as an organic binder or inorganic binder, may be added. In the case where the adsorbent is in the form of particles, the adsorbent preferably has a number-average particle size of 500 µm or more.

In the case where the adsorbent according to the embodiment is used to remove radioactive metal ions contained in radioactive liquid waste, the silica aggregates 1 or the DNA-immobilized silica aggregates 2 preferably have high heat resistance. This is because, for example, the adsorbent may be exposed to a high-temperature environment due to decay heat released when the radioactive substance adsorbed on the adsorbent undergoes radioactive decay. Similarly, the silica aggregates 1 or the DNA-immobilized silica aggregates 2 preferably have high radiation resistance. This is because the adsorbent may be exposed to radiation emitted by the radioactive decay described above. The high heat resistance and/or the high radiation resistance of the silica aggregates 1 or the DNA-immobilized silica aggregates 2 enables the inhibition of the release of the primary silica particles 11 and the DNA 14. This can enhance the ability to adsorb a target substance to be removed when radioactive liquid waste is treated. The silica aggregates 1 or the DNA-immobilized silica aggregates 2 preferably have high resistance to solvents, such as acids and alkalis. They are acid resistance and thus can adsorb metal ions contained in highly acidic liquid waste. Typically, liquid waste generated in a metal recovery process is an acidic solution. Metal ions adsorbed on the silica aggregates 1 or the DNA-immobilized silica aggregates 2 can be separated and recovered from the silica aggregates 1 or the DNA-immobilized silica aggregates 2 with an acid or a chelating agent. The silica aggregates 1 or the DNA-immobilized silica aggregates 2 are alkali resistant. Thus, the silica aggregates 1 or the DNA-immobilized silica aggregates 2 can also function in an alkaline environment. For example, they can be used in treatment for the immobilization of heavy metals in fly ash from refuse incineration. In the treatment for the immobilization of heavy metals in fly ash emitted from refuse incineration, an immobilizing agent for a heavy metal is added to the fly ash emitted from the refuse incineration, and the re-elution of heavy metals is required to be inhibited in fly ash in an alkaline environment. The high acid resistance and/or the high alkali resistance of the silica aggregates 1 or the DNA-immobilized silica aggregates 2 enables the inhibition of the release of the DNA 14 from the silica aggregates. This can enhance the ability to adsorb a target substance to be removed when liquid waste and incineration fly ash are treated.

Adsorption Column

Figure 3:
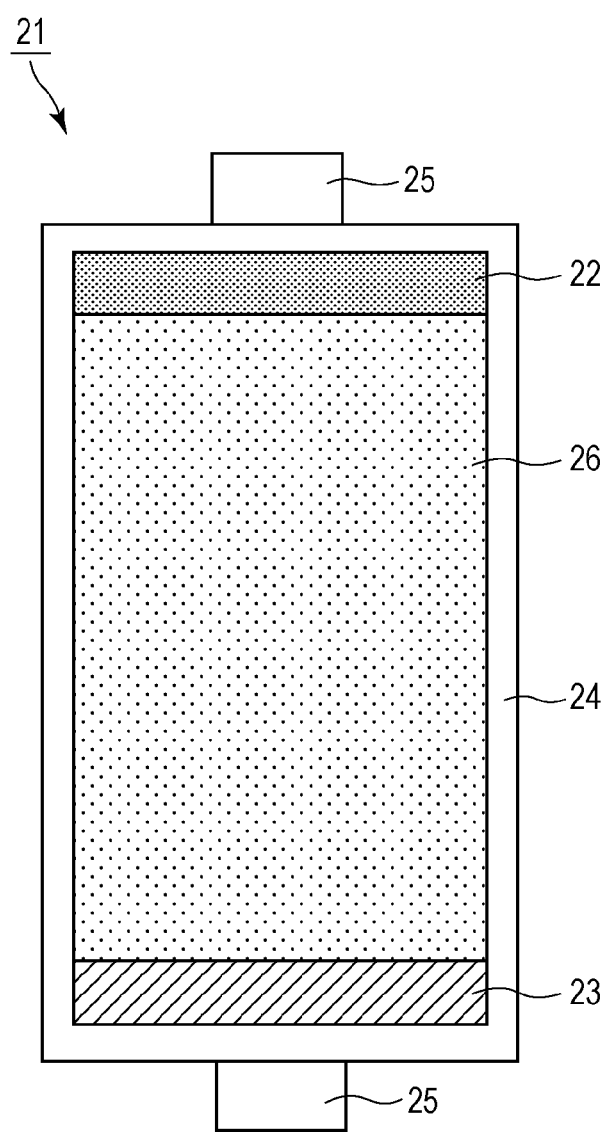
FIG. 3 is a schematic view of an example of the structure of an adsorption column.

FIG. 3 is a schematic view of an example of the structure of an adsorption column 21 packed with an adsorbent 26 containing the silica aggregates 1. The adsorption column 21 according to the embodiment includes a column container 24 and the adsorbent 26 packed in the column container 24. The adsorbent 26 contains the silica aggregates 1. The adsorbent 26 may contain the DNA-immobilized silica aggregates 2 instead of the silica aggregates 1. As illustrated in FIG. 3, the adsorption column 21 may further include a top filter 22, a bottom filter 23, and column connections 25. The adsorption column 21 has an opening adjacent to the top filter 22 and an opening adjacent to the bottom filter 23. By allowing a liquid to flow from one opening to the other opening, the liquid can be brought into contact with the adsorbent 26. Thereby, a substance, such as a metal ion, contained in the liquid can be adsorbed. The adsorption column is also referred to as an adsorption tower.

The top filter 22 has a function of preventing the adsorbent 26 packed in the column container 24 from scattering in the liquid during the passage of the liquid. The bottom filter 23 has a function of preventing the adsorbent 26 packed from flowing out from the adsorption column 21. The adsorption column 21 need not necessarily include the top filter 22 or the bottom filter 23. In this case, the diameter of each of the openings of the adsorption column 21 is preferably smaller than the size of the adsorbent 26.

The internal structure of the adsorption column 21 is not particularly limited. Preferably, a liquid introduced into the adsorption column 21 comes into sufficient contact with the adsorbent 26 packed in the adsorption column 21, and then flows out of the adsorption column 21. For example, it is possible to use a structure in which liquid waste flows radially from the center (central axis) of the adsorption column 21 to the outer periphery.

The shape of the column container 24 is not particularly limited. For example, a cylindrical container can be used. The column container 24 may be composed of stainless steel or a duplex stainless steel in order to prevent leakage of, for example, the adsorbent 26, a target substance to be removed, the substance having been adsorbed on the adsorbent, and a liquid flowing through the adsorption column 21.

Each of the column connections 25 has a function of establishing connection with a pipe, such as a pipe of a cleaning system, for supplying or discharging a liquid flowing through the adsorption column 21. Furthermore, each of the column connections 25 may have a function of preventing leakage of contents, such as the liquid remaining in the adsorption column 21 and a target substance to be removed, the substance having been adsorbed on the adsorbent 26, when the pipe is removed from the adsorption column 21.

In the case where the adsorption column 21 according to the embodiment is used to remove radioactive metal ions and so forth contained in radioactive liquid waste, the column container 24 is preferably composed of a radiation shielding material, such as lead that shields radiation. Alternatively, as an outer container that covers the outside of the column container 24, a container composed of the radiation-shielding material may be used. In this case, the column container 24 includes the outer container composed of lead that shields radiation, the outer container being configured to reduce the amount of radiation emitted to the outside of the adsorption column 21 and to reduce the exposure dose of a worker working around the adsorption column 21. The adsorption column 21 may have a vent for releasing hydrogen, generated by decomposition of water due to radiation, to the outside of the column container 24. For this application, the top filter 22, the bottom filter 23, the column container 24, and the column connections 25 are each preferably composed of a material highly resistant to heat and radiation.

Cleaning System

Figure 4:
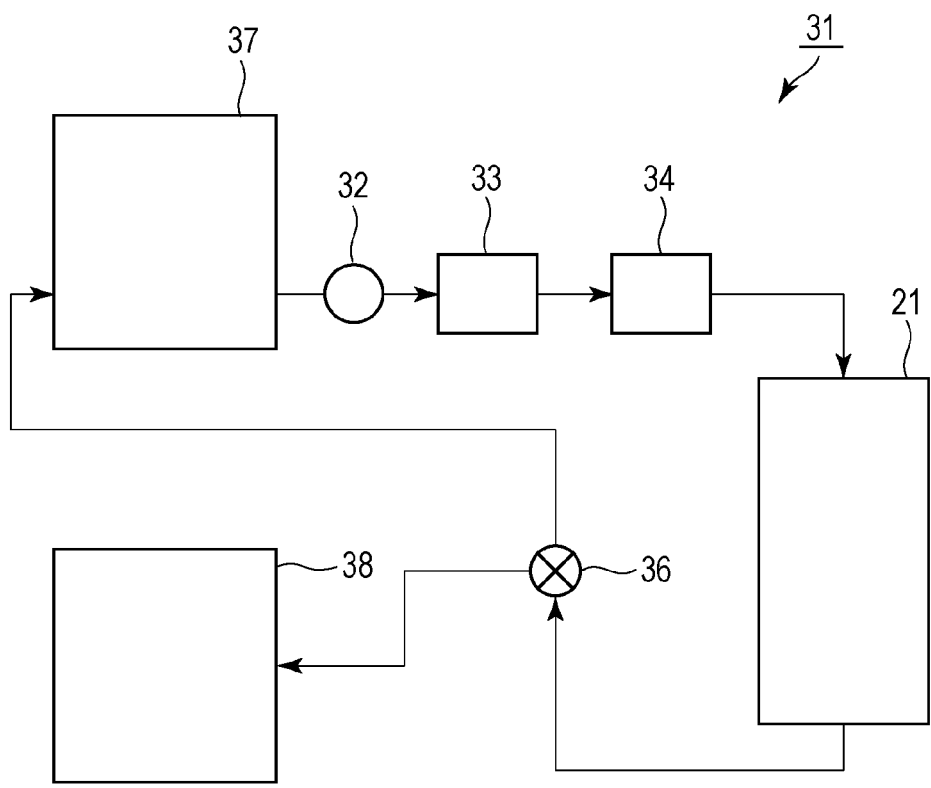
FIG. 4 is a schematic view of an example of the structure of a cleaning system.

FIG. 4 is a schematic view of an example of the structure of a cleaning system 31 including the adsorption column 21 packed with the adsorbent 26 containing the silica aggregates 1. The adsorbent 26 may contain the DNA-immobilized silica aggregates 2 instead of the silica aggregates 1. The cleaning system 31 according to the embodiment includes the adsorption column 21 and liquid feeding unit arranged to feed a liquid into the adsorption column 21. As illustrated in FIG. 4, the cleaning system 31 may further include a filtration unit 33, a pretreatment unit 34, a channel switching valve 36, a liquid waste tank 37, and a treated liquid tank 38.

A pump 32 is the liquid feeding unit that feeds a liquid containing a substance, such as a metal ion, to be removed by the cleaning system 31 into the adsorption column 21. The pump 32 can adjust the feed rate of the liquid fed into the adsorption column 21. The pump 32 is located upstream of the adsorption column 21 in FIG. 4, but may be located downstream of the adsorption column 21. In the case where the cleaning system 31 further includes the filtration unit 33 and the pretreatment unit 34, the pump 32 serving as the liquid feeding unit also has a function of feeding a liquid into these units. In this case, an additional pump 32 may further be arranged between the pretreatment unit 34 and the adsorption column 21 in such a manner that the liquid can be fed into the adsorption column 21.

The filtration unit 33 serves to remove an insoluble solid component contained in a liquid (typically, liquid waste) supplied to the cleaning system 31. Examples of the insoluble solid component include particulate substances having a particle size of 1 μm or more.

The pretreatment unit 34 is a unit arranged to perform pretreatment of a liquid to be fed into the adsorption column 21. For example, in the pretreatment unit 34, a pH modifier is supplied to the liquid, and the resulting mixture is stirred. This enables the adjustment of the pH of the liquid fed into the adsorption column 21.

The channel switching valve 36 is a valve arranged to switch the channel of an eluate from the adsorption column 21. In this embodiment, the eluate from the adsorption column 21 can be supplied again to the upstream side of the adsorption column 21 by switching the channel with the channel switching valve. Thereby, the liquid can be passed multiple times through the adsorption column 21.

The liquid waste tank 37 is a tank that stores a liquid to be cleaned by the cleaning system 31. The liquid waste tank 37 also serves as a supply port to feed the liquid, to be cleaned by the cleaning system 31, into the cleaning system 31. The treated liquid tank 38 is a tank that stores the liquid that has been treated by the cleaning system 31.

While descriptions have been given of the pump 32 serving as the liquid feeding unit in this embodiment, the liquid feeding unit is not limited thereto. Examples of the liquid feeding unit that may be used include unit arranged to feed a liquid by gravity and unit arranged to feed a liquid by a centrifugal force.

Method for Treating Liquid

An example of a method for treating a liquid with the silica aggregates 1 will be described below with reference to FIGS. 4 and 5. A method according to the embodiment for treating a liquid is a method for treating a liquid containing a substance, such as a metal ion, and includes a step of bringing the liquid into contact with an adsorbent containing the silica aggregates 1. Details will be described below. The DNA-immobilized silica aggregates 2 may be used instead of the silica aggregates 1.

Figure 5:
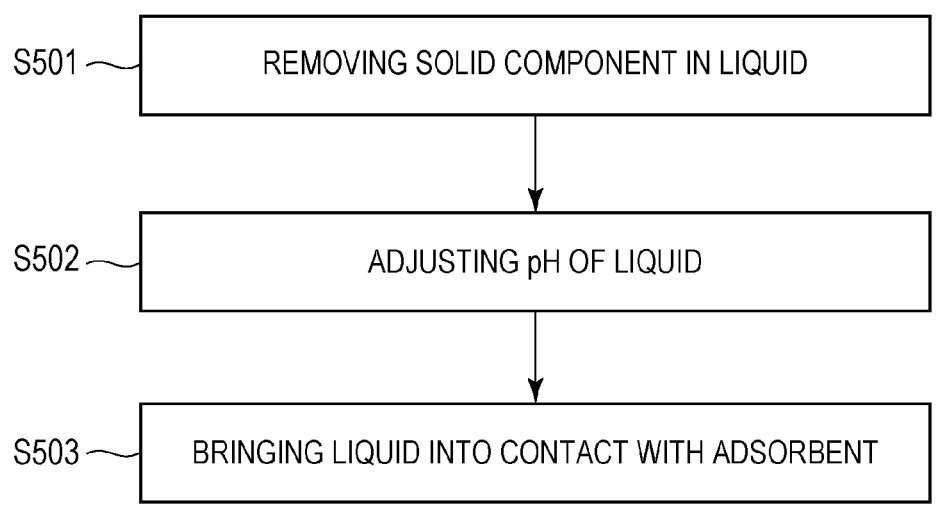
FIG. 5 is a flow chart of an example of a method for treating a liquid.

FIG. 5 is a flow chart illustrating the procedure of a method according to the embodiment for treating a liquid. The method according to the embodiment for treating a liquid is a method in which a liquid is brought into contact with an adsorbent containing the silica aggregates 1 to adsorb and remove a substance, such as a metal ion, in the liquid. Thus, the method can also be referred to as a method for cleaning a liquid, such as liquid waste or contaminated water containing a target substance to be removed.

In step S501, a liquid (liquid waste or contaminated water) to be cleaned is fed into the filtration unit 33 through a pipe. An insoluble solid component contained in the liquid is removed by the filtration unit 33.

In step S502, the liquid from which the solid component has been removed is fed into the pretreatment unit 34 through a pipe. In the pretreatment unit 34, a pH modifier is added to the liquid, and the resulting mixture is stirred to adjust the pH of the liquid to a target value. The target pH value can be optimally selected to remove a target substance to be removed, such as metal ions. For example, Ru can precipitate in an alkaline liquid; thus, it is preferable to add hydrochloric acid to liquid waste to adjust the pH of the liquid waste to about 2. However, this does not apply in the case of a low Ru concentration.

In step S503, the pretreated liquid is fed into the adsorption column 21 through a pipe. The liquid fed into the adsorption column 21 passes through the adsorbent 26 packed in the adsorption column 21. At this time, the target substance to be removed, such as metal ions, in the liquid is adsorbed by the silica aggregates 1 contained in the adsorbent 26 and is removed from the liquid discharged from the adsorption column 21.

The liquid flowing out of the adsorption column 21 may be fed into the treated liquid tank 38 or may be fed into the liquid waste tank 37 and supplied to the adsorption column 21 again.

In the case where the cleaning system 31 includes the pump 32, the supply of the liquid in part or all of steps S501 to S503 is performed with the pump. In the case where the cleaning system 31 does not include the filtration unit 33 or the pretreatment unit 34, the steps (steps S501 and S502) performed with these units are skipped, and the liquid is subjected to the next step.

Method for Recovering Metal from Liquid

An example of a method for recovering a metal from a liquid with the silica aggregates 1 will be described. A method according to the embodiment for recovering a metal from a liquid is a method for recovering a metal from a liquid containing a substance, such as an ion containing at least one element selected from the group consisting of metal elements and includes the steps of bringing the liquid into contact with an adsorbent containing the silica aggregates 1 and recovering a metal from the adsorbent. The adsorbent can be reused. The DNA-immobilized silica aggregates 2 may be used instead of the silica aggregates 1.

A specific example will be described below. A liquid containing target ions to be recovered (liquid waste or contaminated water) is supplied to an adsorption column through a pipe. The liquid supplied to the adsorption column passes through the adsorbent packed in the adsorption column. At this time, a target substance to be recovered, such as ions, in the liquid is adsorbed by the silica aggregates 1 contained in the adsorbent. The liquid flowing out of the adsorption column may be fed into the treated liquid tank or may be fed into the liquid waste tank and supplied to the adsorption column again.

A method for separating target ions to be recovered from the adsorbent containing the silica aggregates 1 will be described below. For example, a metal can be recovered by thermally decomposing the adsorbent containing the silica aggregates 1 on which the target ions to be recovered have been adsorbed is heated. For example, adsorbed metal ions can be recovered by thermally decomposing the silica aggregates.

A metal can be recovered by being brought into contact with a liquid (eluent) containing an acid, an alkali, or a chelating agent. The eluent is supplied to the adsorption column through a pipe. The eluent supplied to the adsorption column passes through the adsorbent packed in the adsorption column. At this time, a target substance to be recovered, such as ions, is eluted from the silica aggregates 1 contained in the adsorbent. The liquid eluted from the adsorption column may be fed into the treated liquid tank or may be fed into the liquid waste tank and supplied to the adsorption column again. The eluted metal ions can be recovered in the form of hydroxide or chloride.

To increase the purity of the target ions to be recovered, a cleaning solution may be passed through the adsorption column. In this case, impurities weakly adsorbed on the adsorbent can be washed away.

Additionally, the silica aggregates 1 are renewable and thus can be repeatedly used for metal recovery from liquids. Thus, the metal can be recovered at lower cost than before.

Method for Treating Heavy Metal in Incineration Fly Ash

The silica aggregates 1 according to an embodiment of the present invention can be used as an agent for treating a heavy metal in incineration fly ash to immobilize a toxic metal, such as lead, cadmium, zinc, or copper, contained in incineration fly ash emitted during the burning of waste. An example of a method for treating a heavy metal in incineration fly ash with the silica aggregates 1 will be described below.

As an example of a method according to an embodiment of the present invention for treating a heavy metal in incineration fly ash, the silica aggregates 1 according to an embodiment of the present invention is added to the incineration fly ash in the form of a solid powder or slurry in an amount of 0.01% to 10% by weight with respect to incineration fly ash, and the resulting mixture is kneaded. At this time, in order to facilitate disposal of the treated incinerated fly ash, water is preferably added thereto in an amount of 5% to 50% by weight with respect to the incineration fly ash before kneading. The DNA-immobilized silica aggregates 2 may be used instead of the silica aggregates 1.

EXAMPLES

While the present invention will be described in more detail with reference to examples, the present invention is not limited to the following.

Measurement of Average Particle Size

An example of a method for measuring the average particle size of primary silica particles is a method including measurement of the surface area of aggregates. In each of the following examples, as the average particle size of primary silica particles included in the silica aggregates, an average particle size calculated from a BET specific surface area measured by a gas adsorption method and the density was used. Instead of the BET specific surface area, a surface area calculated by titration with sodium hydroxide (the Sears method) may be used.

Measurement of Aluminum Oxide Content (% by Mass) with Respect to Silica

In the following examples, the aluminum oxide (alumina) content (% by mass) of silica aggregates was calculated on the basis of the primary-particle silica ($SiO_2$) content and the aluminum oxide (alumina, $Al_2O_3$) content of a colloidal silica solution. In the following examples and comparative examples, because the source of silica and alumina is only the colloidal silica solution, the proportions thereof in the colloidal silica solution are matched to those in the resulting silica aggregates. Thus, the alumina content based on 100% by mass of the silica content of the colloidal silica solution may be used as the alumina content with respect to silica in the silica aggregates. For example, in the case where the silica concentration in a colloidal silica solution used in an example is 10% by mass and where the alumina concentration therein is 0.1% by mass, the aluminum content (% by mass) with respect to silica is determined by dividing 0.1 by 10 and multiplying the quotient by 100 and found to be 1.0% by mass.

Quantification of Metal Ion

In each of the following examples, the quantification of metal ions was performed by inductively coupled plasma-atomic emission spectroscopy (ICP-AES).

Calculation of DNA Content

In each of the following examples, the term "DNA content" refers to the percentage of the mass of DNA in a DNA complex with respect to the mass of the DNA complex. For example, in the case where the amount of a DNA complex is 1 g and where the amount of DNA immobilized on the DNA complex is 0.1 g, the DNA content is 10% by mass.

In each of the following examples, the DNA content was measured by an absorbance method or an XPS method. In the absorbance method (a method based on absorbance measurement), all washings are collected at the time of the preparation of a DNA complex, and the amount of DNA in the collected washings is determined by measuring the absorbance of the collected washings at 260 nm. The amount of DNA obtained here is the amount of DNA that is not immobilized on carriers (silica aggregates) in the process of producing the DNA complex. Thus, the amount of DNA immobilized on the carriers can be calculated by subtracting the amount of DNA obtained here from the amount of DNA used for the production of the DNA complex. In the XPS method (a method by XPS), the amount of DNA immobilized on the carriers can be calculated by quantifying the amount of phosphorus on the surface of the DNA complex and comparing it with the amount of phosphorus in a reference sample.

Measurement of Molecular Weight of DNA

In each of the following examples, the molecular weight of DNA refers to the average molecular weight of DNA. The average molecular weight of DNA can be measured by, for example, agarose electrophoresis or gel permeation chromatography. In agarose electrophoresis, the average molecular weight of a sample can be measured by simultaneously electrophoresing a DNA marker having a known molecular weight. In particular, native DNA, such as DNA from testes of mammals and fish, may have a molecular weight distribution unlike synthetic products having a uniform molecular weight. In such a case, electrophoresis indicates a broad DNA band. If DNA has a molecular weight distribution, the center of the band is defined as the value of the average molecular weight. Gel permeation chromatography is a technique in which an analyte is separated on the basis of molecular size. The molecular weight of DNA can be measured using a standard sample having a known molecular weight.

Measurement of Single-Stranded DNA Content

In each of the following examples, the single-stranded DNA content (also referred to as a single-strand content) with respect to the total DNA in the resulting DNA complex was calculated by measuring, at 260 nm, the absorbance of an aqueous DNA solution used for the preparation of the DNA complex. This is based on the principle that, when double-stranded DNA is denatured into single-stranded DNA, the stacking interaction between nucleobases is lost to increase the absorbance at 260 nm.

Specifically, the absorbance of the aqueous DNA solution at 260 nm (this is referred to as A25) is measured at room temperature. Then the aqueous DNA solution is heated at 95° C. for 30 minutes to denature double-stranded DNA in the aqueous DNA solution into single-stranded DNA, and the absorbance thereof at 260 nm (this is referred to as A95) is measured again. Here, in the case where the double-stranded DNA content is 100% by mass with respect to the total DNA contained in the aqueous DNA solution, A95/A25 was 1.34. In the case where the double-stranded DNA content is 0% by mass, the value of A95/A25 is 1.0. The single-stranded DNA content was determined from the measurement results of the absorbance at 25° C. (A25) and the absorbance at 95° C. (A95) using a calibration curve obtained from that relationship.

The single-stranded DNA content measured by this method is the single-stranded DNA content in the aqueous DNA solution. In the following examples, this single-stranded DNA content is considered to match the single-stranded DNA content with respect to the total DNA contained in the DNA complex. This is presumably because single-stranded DNA in the aqueous DNA solution is very unlikely to form double-stranded DNA during the preparation of the DNA complex in each of the following examples.

The first reason is that, in the preparation of the DNA complex, the aqueous DNA solution is mixed with carriers such as silica, and single-stranded DNA is seemingly immobilized on the carriers not at one position in each molecule of the single-stranded DNA but at multiple positions (multipoint immobilization). In the DNA immobilized on the carriers at the multiple positions, the phosphate groups and bases of the DNA backbone are partially buried in the carriers. It is thus difficult to form base pairs, which are essential for stabilizing the double-stranded structure, formed between complementary DNA strands. To stably form a double-strand structure, it is important to achieve a good balance between the interaction of the bases stacked and the repulsive force between the phosphate groups. That is, in order to form double-stranded DNA, a certain number of consecutive base pairs are needed. Second, in each of the following examples, the silica solution is an alkaline solution having a pH of 9 or more, which is not a preferable neutral environment for forming a double-stranded DNA.

Example 1

Production of Silica Aggregate

In this example, silica aggregates were produced using silica having an average primary particle size of 4 nm to 6 nm.

First, 7.2 g of a siloxane solution (solid content: 15%) containing a basic functional group represented by formula (13) below was added to 60 g of a colloidal silica solution (available from Nissan Chemical Corporation, Snowtex CXS, primary particle size: 4 nm to 6 nm) having a solid content of 15% (by weight). The mixture was stirred at room temperature for 60 minutes. The colloidal silica solution used in Example 1 had a $SiO_2$ concentration of 14% by mass and an $Al_2O_3$ concentration of 0.43% by mass. The foregoing siloxane solution is hereinafter referred to as "siloxane solution Ni". A silane compound represented by formula (13) is an alkoxy oligomer, which is a condensate resulting from the partial hydrolysis thereof, having a degree of polymerization of 10 or more.

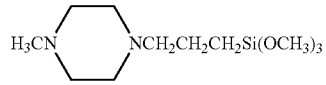

(13)

A solvent in the resulting silica solution was removed at 70° C. with a rotary evaporator. Drying was then performed at 70° C. for 15 hours. The resulting solid was pulverized to give silica aggregates CXS.

Preparation of Strengthening Treatment Solution

First, 5.5 g of a methyl silicate solution (MS56, available from Mitsubishi Chemical Corporation) was added to 24.6 g of methanol. Then 0.17 g of hydrochloric acid (35%) was added to 24.6 g of ion-exchanged water. These solutions were mixed. The mixture was stirred at room temperature for 24 hours to prepare a strengthening treatment solution Si.

Strengthening Treatment of Silica Aggregate

First, 5.5 g of the silica aggregates CXS was immersed in 54.9 g of the strengthening treatment solution S1 at room temperature for 1 day under stirring. The solid was separated from the strengthening treatment solution S1 and washed with 55 g of ion-exchanged water. The washing operation was repeated twice, and then the resulting solid was dried at 70° C. for 2 days to give about 6 g of silica aggregates CXSS in which the primary particles were crosslinked by bonds containing siloxane bonds.

The BET specific surface area of the silica aggregates CXSS was measured and found to be 214 $m^2/g$. Observation of the silica aggregates CXSS with a scanning electron microscope (Model S5500, available from Hitachi High-Tech Corporation) at an acceleration voltage of 2 kV revealed that the silica aggregates CXSS were formed of particles having a size of about 100 μm to about 400 μm.

The silica aggregates CXS produced in this example are silica aggregates in a state before the strengthening treatment is performed with the strengthening treatment solution S1. However, the silica aggregates CXS contain the siloxane compound, represented by formula (13), contained in the siloxane solution N1 in the production process. Thus, for example, in the step of removing the solvent, the primary particles are seemingly crosslinked by bonds containing siloxane bonds originating from the siloxane compound. Accordingly, the primary particles are seemingly crosslinked in the silica aggregates CSX.

Comparative Example 1

For comparison, silica aggregates were produced as in Example 1, except that colloidal silica having an average particle size of 10 nm to 15 nm was used in place of the colloidal silica having average particle size of 4 nm to 6 nm.

Specifically, 3.6 g of the siloxane solution N1 was added to 48 g of a colloidal silica solution (available from Nissan Chemical Corporation, Snowtex C, primary particle size: 10 nm to 15 nm) having a solid content of 20% (by weight). The mixture was stirred at room temperature for 60 minutes. The colloidal silica solution used in Comparative example 1 had a $SiO_2$ concentration of 20% by mass and an $Al_2O_3$ concentration of 0.17% by mass. A solvent in the resulting silica solution was removed at 70° C. with a rotary evaporator. Drying was then performed at 70° C. for 15 hours. The resulting solid was pulverized to give silica aggregates C. As with Example 1, the silica aggregates C was then subjected to strengthening treatment, thereby providing silica aggregates CS in which the primary particles were crosslinked by bonds containing siloxane bonds.

Comparative Example 2

For comparison, silica aggregates were produced as in Example 1, except that colloidal silica having an average particle size of 20 nm to 25 nm was used in place of the colloidal silica having average particle size of 4 nm to 6 nm.

Specifically, 3.6 g of the siloxane solution N1 was added to 30 g of a colloidal silica solution (available from Nissan Chemical Corporation, Snowtex CM, primary particle size: 10 nm to 25 nm) having a solid content of 30% (by weight). The mixture was stirred at room temperature for 60 minutes. The colloidal silica solution used in Comparative example 2 had a $SiO_2$ concentration of 30% by mass and an $Al_2O_3$ concentration of 0.26% by mass. A solvent in the resulting silica solution was removed at 70° C. with a rotary evaporator. Drying was then performed at 70° C. for 15 hours. The resulting solid was pulverized to give silica aggregates CM. As with Example 1, the silica aggregates CM was then subjected to strengthening treatment, thereby providing silica aggregates CMS in which the primary particles were crosslinked by bonds containing siloxane bonds.

The BET specific surface area of the silica aggregates CMS was measured and found to be 151 $m^2/g$.

Example 2

Silica aggregates were produced as in Example 1, except that no coupling agent (siloxane solution N1) was used.

Specifically, a solvent in 60 g of a colloidal silica solution (available from Nissan Chemical Corporation, Snowtex CXS, primary particle size: 4 nm to 6 nm) having a solid content of 15% (by weight) was removed at 70° C. with a rotary evaporator. Drying was then performed at 70° C. for 15 hours. The resulting solid was pulverized to give silica aggregates CXSBL. Next, 5.5 g of the silica aggregates CXSBL was immersed in 54.9 g of the strengthening treatment solution Si at room temperature for 1 day under stirring. The silica aggregates CXSBL was then separated from the strengthening treatment solution Si and washed with 55 g of ion-exchanged water. The washing operation was repeated twice, and then the resulting solid was dried at 70° C. for 2 days to give about 6 g of silica aggregates CXSBLS in which the primary particles were crosslinked by bonds containing siloxane bonds.

Example 3

An example of the production of DNA-containing silica aggregates according to an embodiment of the present invention (DNA-immobilized silica aggregates) will be described below.

Single-stranded DNA (available from L·S Corporation, average molecular weight: 50,000, single-stranded DNA content: 89%) originating from salmon milt was dissolved in ion-exchanged water to prepare an aqueous DNA solution having a DNA concentration of 10% by weight.

Hydrochloric acid was added to 30 g of a colloidal silica solution (available from Nissan Chemical Corporation, Snowtex CXS, primary particle size: 4 nm to 6 nm) having a solid content of 15% (by weight) to adjust the pH to 9.2. To this solution, 3.6 g of the siloxane solution N1 was added. The mixture was stirred for 30 minutes, and then the foregoing aqueous DNA solution (54 g) was added thereto.

The resulting mixture containing silica and DNA was stirred at room temperature for 60 minutes. A solvent in the mixture was then removed at 70° C. with a rotary evaporator. Drying was then performed at 70° C. for 15 hours. The resulting solid was pulverized to give single-stranded DNA-immobilized silica aggregates CXS.

As with Example 1, the single-stranded DNA-immobilized silica aggregates CXS were subjected to strengthening treatment to crosslink the primary particles by siloxane bonds. The resulting product is referred to as single-stranded DNA-immobilized silica aggregates CXSS. The DNA content of the single-stranded DNA-immobilized silica aggregates CXSS was measured by an absorbance method and found to be 33.1% by weight.

Example 4

DNA-immobilized silica was produced as in Example 3, except that double-stranded DNA (average molecular weight: 6,600,000, double-stranded DNA content: 82%) was used as the DNA. Specifically, 0.27 g of double-stranded DNA (average molecular weight: 6,600,000) originating from salmon milt was dissolved in 53.73 g of ion-exchanged water to prepare an aqueous double-stranded DNA solution (DNA concentration: 0.5% by weight) having very high viscosity. The resulting DNA-immobilized silica aggregates are referred to as double-stranded DNA-immobilized silica aggregates CXS.

As with Example 1, the double-stranded DNA-immobilized silica aggregates were subjected to strengthening treatment to give double-stranded DNA-immobilized silica aggregates CXSS in which the primary particles were crosslinked by siloxane bonds. The DNA content of the double-stranded DNA-immobilized silica aggregates CXSS was measured by an absorbance method and found to be 3.0% by weight.

Adsorption Test for Various Substances

The silica aggregates and the DNA-immobilized silica aggregates produced in Examples 1 to 4 and Comparative examples 1 and 2 were subjected to adsorption tests for substances below.

Cesium Adsorption Test

The silica aggregates and the DNA-immobilized silica aggregates produced in Examples 1 to 4 and Comparative examples 1 and 2 were subjected to a cesium adsorption test. For comparison, zeolite A, which is widely used as a cesium removing agent, was also subjected to the cesium adsorption test.

Preparation of Aqueous Cesium Solution

Cesium chloride (available from Kishida Chemical Co., Ltd.) was dissolved in ion-exchanged water, 10% seawater, and 34% seawater to prepare aqueous cesium solutions each having a cesium concentration of 20 mg/L (20 ppm). The aqueous cesium solutions are referred to as an aqueous cesium solution (ion-exchanged water), an aqueous cesium solution (10% seawater), and an aqueous cesium solution (34% seawater), respectively. An artificial seawater solution was prepared by dissolving 36 g of Daigo's Artificial Seawater SP (available from Wako Pure Chemical Industries), which is a reagent for preparing artificial seawater, in 1 L of ion-exchanged water and was used as a seawater solution for preparing the aqueous cesium solutions. The resulting solution was used as 100% seawater and diluted 3 or 10 times with ion-exchanged water to prepare 34% or 10% seawater.

Batch Adsorption Test

The silica aggregates and the DNA-immobilized silica aggregates produced in Examples 1 to 4 and Comparative examples 1 and 2 and zeolite A were placed in respective 15-mL plastic tubes in an amount of 0.1 g each. To each of the tubes, 10 mL of the aqueous cesium solution was added. These solutions were gently stirred at room temperature. After a lapse of 24 hours, a portion of each of the aqueous cesium solutions was collected. Each of the collected aqueous cesium solutions was subjected to centrifugation. The resulting supernatant was passed through a filter having a pore size of 0.45 μm. The cesium concentration in the resulting aqueous solution was measured by ICP-AES. The cesium ion removal rate of each sample was calculated from the cesium concentration in the aqueous solution. This operation was performed for each of the aqueous cesium solution (ion-exchanged water), the aqueous cesium solution (10% seawater), and the aqueous cesium solution (34% seawater). Table 1 summarizes the results.

Strontium Adsorption Test

The silica aggregates and the DNA-immobilized silica aggregates produced in Examples 1 to 4 and Comparative examples 1 and 2 were subjected to a strontium adsorption test.

Preparation of Aqueous Strontium Solution

Strontium chloride hydrate (available from Kishida Chemical Co., Ltd.) was dissolved in ion-exchanged water, 10% seawater, and 34% seawater to prepare aqueous strontium solutions each having a strontium concentration of 2 mg/L (2 ppm). The aqueous strontium solutions are referred to as an aqueous strontium solution (ion-exchanged water), an aqueous strontium solution (10% seawater), and an aqueous strontium solution (34% seawater), respectively. An artificial seawater solution the same as that used for the preparation of the aqueous cesium solutions was used as a seawater solution for preparing the aqueous strontium solutions.

Batch Adsorption Test

As with the cesium adsorption test, the silica aggregates and the DNA-immobilized silica aggregates produced in Examples 1 to 4 and Comparative examples 1 and 2 were placed in respective 15-mL plastic tubes in an amount of 0.1 g each. To each of the tubes, 10 mL of the aqueous strontium solution was added. These solutions were gently stirred at room temperature. After a lapse of 24 hours, a portion of each of the aqueous strontium solutions was collected. Each of the collected aqueous strontium solutions was subjected to centrifugation. The resulting supernatant was passed through a filter having a pore size of 0.45 μm. The strontium concentration in the resulting aqueous solution was measured by ICP-AES. The strontium ion removal rate of each sample was calculated from the strontium concentration in the aqueous solution. This operation was performed for each of the aqueous strontium solution (ion-exchanged water), the aqueous strontium solution (10% seawater), and the aqueous strontium solution (34% seawater). Table 1 summarizes the results.

Ruthenium Adsorption Test

The silica aggregates and the DNA-immobilized silica aggregates produced in Examples 1 to 4 and Comparative examples 1 and 2 were subjected to a ruthenium adsorption test.

Preparation of Aqueous Ruthenium Solution

An artificial seawater solution was prepared by dissolving 36 g of Daigo's Artificial Seawater SP (available from Wako Pure Chemical Industries), which is a reagent for preparing artificial seawater, in 1 L of ion-exchanged water. The resulting solution was used as 100% seawater and diluted 3 times with 0.01 N hydrochloric acid to prepare 34% seawater.

Ruthenium chloride (ruthenium(III) chloride n-hydrate, available from Kishida Chemical Co., Ltd.) was dissolved in 34% seawater to prepare an aqueous ruthenium solution (34% seawater) having a ruthenium concentration of 10 mg/L (10 ppm).

Ruthenium chloride (ruthenium(III) chloride n-hydrate, available from Kishida Chemical Co., Ltd.) was dissolved in 0.01 N hydrochloric acid to prepare an aqueous ruthenium solution (ion-exchanged water) having a ruthenium concentration of 10 mg/L (10 ppm).

Batch Adsorption Test

The silica aggregates and the DNA-immobilized silica aggregates produced in Examples 1 to 4 and Comparative examples 1 and 2 were placed in respective 15-mL plastic tubes in an amount of 0.1 g each. To each of the tubes, 10 mL of the aqueous ruthenium solution was added. These solutions were gently stirred at room temperature. After a lapse of 24 hours, a portion of each of the aqueous ruthenium solutions was collected. Each of the collected aqueous ruthenium solutions was subjected to centrifugation. The resulting supernatant was passed through a filter having a pore size of 0.45 μm. The ruthenium concentration in the resulting aqueous solution was measured by ICP-AES. The ruthenium ion removal rate of each DNA complex was calculated from the ruthenium concentration in the aqueous solution. This operation was performed for the aqueous ruthenium solution (ion-exchanged water). For the silica aggregates CXSS and the single-stranded DNA-immobilized silica aggregates CXSS, the test was also performed using the aqueous ruthenium solution (34% seawater). Table 1 summarizes the results.

TABLE 1

| | | Silica aggregate | | | | | | | Adsorption test | | | | | | | |
|---|---|---|---|---|---|---|---|---|---|---|---|---|---|---|---|---|
| | | Carrier Primary particle size | Siloxane solution | Strengthening treatment | DNA Type | DNA Content (wt %) | Specific surface area (m²/g) | Alumina content with respect to silica (wt %) | Cs | | | Sr | | | Ru | |
| | | | | | | | | | In ion-exchanged water (%) | In 10% seawater (%) | In 34% seawater (%) | In ion-exchanged water (%) | In 10% seawater (%) | In 34% seawater (%) | In ion-exchanged water (%) | In 34% seawater (%) |
| Example 1 | Silica aggregate CXSS | 4-6 nm | N1 | S1 | — | — | 214 | 3.1 | 91.1 | 72.6 | 55.6 | 99.7 | 18.6 | 13.8 | 9.8 | 5.7 |
| Comparative example 1 | Silica aggregate CS | 10-15 nm | N1 | S1 | — | — | — | 0.9 | 10.7 | 10.1 | 28.8 | 8.0 | 0.0 | 10.6 | 0.0 | — |
| Comparative example 2 | Silica aggregate CMS | 20-25 nm | N1 | S1 | — | — | 151 | 0.9 | 22.7 | 12.5 | 19.0 | 0.4 | 0.1 | 5.5 | 0.0 | — |
| Example 1 | Silica aggregate CXS | 4-6 nm | N1 | — | — | — | — | — | 92.3 | 82.3 | 78.0 | 98.0 | 47.6 | 20.4 | 77.2 | — |
| Example 2 | Silica aggregate CXSBLS | 4-6 nm | — | S1 | — | — | — | — | 99.1 | 88.8 | 80.0 | 95.7 | 42.4 | 10.8 | 51.3 | — |
| Comparative example 3 | Zeolite A | — | — | — | — | — | — | — | 83.7 | 54.0 | 48.8 | — | — | — | — | — |
| Example 3 | Single-stranded DNA-immobilized silica aggregate CXSS | 4-6 nm | N1 | S1 | single stranded | 33.1 | — | — | 91.3 | 63.6 | 58.1 | 99.3 | 47.8 | 28.2 | 92.5 | 88.2 |
| Example 4 | Double-stranded DNA-immobilized silica aggregate CXSS | 4-6 nm | N1 | S1 | double stranded | 3.0 | — | — | 95.8 | 70.5 | 51.8 | 98.2 | 23.7 | 18.4 | 65.2 | — |

The results indicated that the silica aggregates CXSS of Example 1 had a higher adsorption ability than the silica aggregates CS of Comparative example 1 and silica aggregates CMS of Comparative example 2 in any of the adsorption tests.

A smaller particle size of the primary silica particles results in a higher specific surface area of the primary silica particles and a higher specific surface area of the silica aggregates formed of the primary particles. A larger specific surface area results in the increase of adsorption sites that adsorb metal ions and so forth in proportion to the specific surface area. Thus, the removal rates of the ions are seemingly increased in proportion to the specific surface area. The silica aggregates CXSS of Example 1 were produced using the primary silica particles having a smaller particle size than in the silica aggregates CMS of Comparative example 2. The specific surface area thereof was about 1.4 times the specific surface area of the silica aggregates CMS of Comparative example 2. When only the effect of increasing the adsorption sites owing to an increase in specific surface area as described above is considered, the silica aggregates CXSS of Example 1 should exhibit a removal rate about 1.4 times the silica aggregates CMS of Comparative example 2.

As is clear from Table 1, however, the cesium removal rate of the silica aggregates CXSS of Example 1 was improved to a value about 3 to about 6 times that of the silica aggregates CMS of Comparative example 2. This is presumably because the reduction in the particle size of the primary silica particles provided an effect different from the effect of increasing the specific surface area of the silica aggregates. Although the mechanism for this is unclear, this is presumably because silica aggregates having a surface state, pore size, and surface charge suitable for the adsorption of metal ions were produced in addition to the increase in specific surface area by the reduction in the particle size of the primary silica particles. For strontium and ruthenium, it was found that the silica aggregates CXSS of Example 1 had significantly higher adsorption ability than the silica aggregates CMS of Comparative example 2.

Table 1 indicated that as with the silica aggregates CXSS of Example 1, the silica aggregates CXS of Example 1 and the silica aggregates CXSBLS of Example 2 had high adsorption ability for cesium and strontium. Furthermore, the silica aggregates CXS and the silica aggregates CXSBLS also had very high adsorption ability for ruthenium.

The single-stranded DNA-immobilized silica aggregates CXSS (Example 3) and the double-stranded DNA-immobilized silica aggregates CXSS (Example 4), which were DNA-immobilized silica aggregates, had high adsorption ability for all of cesium, strontium, and ruthenium. In particular, these DNA-immobilized silica aggregates had high adsorption ability for ruthenium. Among these, the single-stranded DNA-immobilized silica aggregates had particularly high adsorption ability for ruthenium and exhibited a high removal rate of 88.2% even in 34% seawater.

It was found that each of the silica aggregates and the DNA-immobilized silica aggregates of the examples exhibited a higher cesium removal rate than zeolite A (synthetic zeolite A-3 (Tosoh Corporation), Comparative example 3), which is widely used as a cesium removing agent, and has reached a practical level as a cesium-removing material.

Example 6

DNA-immobilized silica aggregates were produced as in Example 3, except that a washing step was provided before the strengthening treatment.

Specifically, single-stranded DNA-immobilized silica aggregates CXS were produced as in Example 3. Then a 10-fold excess of ion-exchanged water over the resulting solid product was added. The solid product was washed by solid-liquid separation. Drying was then performed at 70° C. for 15 hours. The resulting solid was pulverized to give single-stranded DNA-immobilized silica aggregates CXSW. As with Example 1, the single-stranded DNA-immobilized silica aggregates CXSW were subjected to strengthening treatment to provide single-stranded DNA-immobilized silica aggregates CXSWS. The DNA content of the single-stranded DNA-immobilized silica aggregates CXSWS was measured by an absorbance method and found to be 20.0% by mass.

Example 7

The single-stranded DNA-immobilized silica aggregates CXSWS produced in Example 6 and the silica aggregates CXSS produced in Example 1 were subjected to a test to compare their performance with a commercially available ion-exchange resin widely used for recovering a metal.

Test for Adsorption of Ruthenium and Iridium in Strong Acid

The single-stranded DNA-immobilized silica aggregates CXSWS produced in Example 6 and the silica aggregates CXSS produced in Example 1 were subjected to a test for the adsorption of ruthenium or iridium in a strong acid. For comparison, an anion-exchange rein (Diaion SA20A, available from Mitsubishi Chemical Corporation) was used.

Batch Adsorption Test in Strong Acid

The single-stranded DNA-immobilized silica aggregates CXSWS produced in Example 6, the silica aggregates CXSS produced in Example 1, and the anion-exchange rein were placed in respective 15-mL plastic tubes in an amount of 0.05 g each. To each of the tubes, 5 mL of a ruthenium-containing hydrochloric acid solution or an iridium-containing hydrochloric acid solution was added. Here, the ruthenium-containing hydrochloric acid solution had a hydrochloric acid concentration of 3% and contained 2 ppm ruthenium ions, 2 ppm platinum ions, 2 ppm iron ions, and 10,000 ppm sodium chloride. The iridium-containing hydrochloric acid solution was prepared using iridium ions instead of ruthenium ions of the ruthenium-containing hydrochloric acid solution. For ruthenium, ruthenium(III) chloride hydrate was used. For iridium, hydrogen hexachloroiridate (IV) n-hydrate was used.

These plastic tubes were gently shaken at room temperature. After a lapse of 24 hours, a portion of each of the ruthenium-containing hydrochloric acid solutions or a portion of each of the iridium-containing hydrochloric acid solutions was collected. Each of the collected hydrochloric acid solutions was subjected to centrifugation. The resulting supernatant was passed through a filter having a pore size of 0.45 μm. The concentration of ruthenium or iridium in the resulting hydrochloric acid solution was measured by ICP-AES. From the ruthenium concentration or iridium concentration in each of the resulting hydrochloric acid solutions, the percentage of ruthenium ions or iridium ions adsorbed on each of the single-stranded DNA-immobilized silica aggregates CXSWS, the silica aggregates CXSS, and the ion-exchange resin was calculated. Similarly, percentages of platinum ions and iron ions adsorbed thereon were measured. Table 2 summarizes the results.

It was found that the single-stranded DNA-immobilized silica aggregates CXSWS and the silica aggregates CXSS can adsorb ruthenium and iridium from 3% hydrochloric acid. These aggregates exhibited almost the same adsorption performance as the ion-exchange resin. The single-stranded DNA-immobilized silica aggregates CXSWS and the silica aggregates CXSS did not adsorb platinum ions. The percentage of iron ions adsorbed on the single-stranded DNA-immobilized silica aggregates CXSWS was higher than the percentage of iron ions adsorbed on the ion-exchange resin. The ion-exchange resin adsorbed platinum ions with high efficiency. In the case of the single-stranded DNA-immobilized silica aggregates CXSWS and the silica aggregates CXSS, efficient separation between ruthenium or iridium and platinum can be achieved. The single-stranded DNA-immobilized silica aggregates CXSWS and the silica aggregates CXSS were found to be excellent in selective adsorption of ruthenium and iridium with respect to platinum.

TABLE 2

| | Concentration of hydrochloric acid: 3% | | |
|---|---|---|---|
| | Ion-exchange resin SA20A | Single-stranded DNA-immobilized silica aggregate CXSWS | Silica aggregate CXSS |
| Percentage of ruthenium ion adsorbed % | 9.4 | 3.1 | 9.4 |
| Percentage of platinum ion adsorbed % | 97.5 | 0 | 0 |
| Percentage of iron ion adsorbed % | 1.5 | 35.1 | 3 |
| Percentage of iridium ion adsorbed % | 34.2 | 25.7 | 32.9 |
| Percentage of platinum ion adsorbed % | 98.8 | 1.2 | 0 |
| Percentage of iron ion adsorbed % | 0.7 | 18.8 | 0 |

Example 8

Test for Recovery of Adsorbed Ruthenium or Iridium

The single-stranded DNA-immobilized silica aggregates CXSWS and the silica aggregates CXSS that had adsorbed ruthenium or iridium in Example 7 were subjected to a test for recovery of ruthenium or iridium from the single-stranded DNA-immobilized silica aggregates CXSWS and the silica aggregates CXSS.

Recovery Test

First, 6 N hydrochloric acid was added, in an amount of 1 mL each, to the single-stranded DNA-immobilized silica aggregates CXSWS and the silica aggregates CXSS that had adsorbed ruthenium or iridium in Example 7 (0.05 g). The samples were gently shaken at room temperature for 2 hours, and then the hydrochloric acid solutions were collected. The concentration of ruthenium or strontium in each of the resulting hydrochloric acid solutions was measured by ICP-AES. The results indicated that adsorbed ruthenium or iridium was completely recovered. It was found that the use of concentrated hydrochloric acid enabled the recovery of the metal ions adsorbed on the single-stranded DNA-immobilized silica aggregates CXSWS and the silica aggregates CXSS.

Example 9

Test for Re-Adsorption of Ruthenium

The single-stranded DNA-immobilized silica aggregates CXSWS and the silica aggregates CXSS that had conducted the recovery (desorption) of ruthenium in Example 8 were subjected to a test for re-adsorption of ruthenium. The results of an adsorption test performed as in Example 7 indicated that ruthenium was re-adsorbed. These results indicated that the single-stranded DNA-immobilized silica aggregates CXSWS and the silica aggregates CXSS adsorbed metal ions, the adsorbed metal ions were recovered, and the single-stranded DNA-immobilized silica aggregates CXSWS and the silica aggregates CXSS re-adsorbed metal ions. The single-stranded DNA-immobilized silica aggregates CXSWS and the silica aggregates CXSS can be used as renewable adsorbent for metal recovery.

Example 10

The single-stranded DNA-immobilized silica aggregates CXSWS produced in Example 6 and the silica aggregates CXSS produced in Example 1 were subjected to a simulation test for immobilization of heavy metal ions in incineration fly ash to examine whether the silica aggregates of this example could be used for the treatment of incineration fly ash. As a heavy metal model, lead ions were used because the lead content of ash is high.

Batch Adsorption Test in Alkaline Environment

The single-stranded DNA-immobilized silica aggregates CXSWS produced in Example 6 and the silica aggregates CXSS produced in Example 1 were placed in respective 15-mL plastic tubes in an amount of 0.1 g each. To each of the tubes, 10 mL of an aqueous lead solution was added. The aqueous lead solution had a lead concentration of 10 ppm and a pH of 12 and contained 5,000 ppm calcium as coexisting ions.

These plastic tubes were gently shaken at room temperature. A portion of each of the aqueous lead solutions was collected after 6 hours and 24 hours. Each of the collected solutions was subjected to centrifugation. The resulting supernatant was passed through a filter having a pore size of 0.45 μm. The lead concentration in each solution was measured by ICP-AES. From the lead concentration in each aqueous solution, the percentage of lead ions adsorbed on each of the single-stranded DNA-immobilized silica aggregates CXSWS and the silica aggregates CXSS was calculated. Table 3 presents the results. The results indicated that the single-stranded DNA-immobilized silica aggregates CXSWS and the silica aggregates CXSS adsorbed lead ions in a highly alkaline environment in the presence of calcium ions.

Evaluation of Re-Leaching of Lead Ion

To evaluate the leaching of heavy metal ions from incineration fly ash, a test specified by Notification No. 13 of the Ministry of the Environment was simulatively performed. Specifically, the single-stranded DNA-immobilized silica aggregates CXSWS and the silica aggregates CXSS that had adsorb lead ions in the above batch adsorption test were placed in 10 mL of water (adjusted so as to have a pH of 12) in an amount of 0.1 g each. Each of the mixtures was stirred for 6 hours. Then centrifugation was performed (2,150 G, 20 minutes). The resulting supernatants were each passed through a filter having a pore size of 1.2 μm. The lead concentration in each solution was measured by ICP-AES. The criterion value of the concentration of lead ions leached is 0.3 ppm. Thus, the concentration of lead ions leached needs to be 0.3 ppm or less. When all the adsorbed lead ions are leached, the concentration of lead ions re-leached is 6 to 8 ppm.

Table 3 presents the results. The concentrations of lead ions re-leached from the single-stranded DNA-immobilized silica aggregates CXSWS and the silica aggregates CXSS were each 0.3 ppm or less. The results indicated that lead ions adsorbed on the single-stranded DNA-immobilized silica aggregates CXSWS and the silica aggregates CXSS were little leached. Thus, the single-stranded DNA-immobilized silica aggregates CXSWS and the silica aggregates CXSS were found to be practical as agents for treating a heavy metal in incineration fly ash.

TABLE 3

| | Percentage of lead adsorbed (%) | |
| --- | --- | --- |
| | Adsorption for 6 hours | Adsorption for 24 hours |
| Single-stranded DNA-immobilized silica aggregate CXSWS | 78.1 | 81.4 |
| Silica aggregate CXSS | 87.6 | 86.0 |

| | Concentration of lead re-leached in simulative test of No 13 (ppm) |
| --- | --- |
| Single-stranded DNA-immobilized silica aggregate CXSWS | 0.06 |
| Silica aggregate CXSS | 0.02 |

Example 11

Test for Adsorption of Palladium

The silica aggregates CXSS produced in Example 1 were subjected to a test for the adsorption of palladium.

Batch Adsorption Test

First, 0.1 g of the silica aggregates CXSS produced in Example 1 were placed in a 15-mL plastic tube. To the tube, 10 mL of an aqueous palladium solution, which contained 34% seawater and adjusted so as to have a pH of 2 with hydrochloric acid, (palladium concentration: 10 ppm) was added. The tube was gently shaken. After a lapse of 24 hours, a portion of the aqueous palladium solution was collected. The collected aqueous palladium solution was subjected to centrifugation. The resulting supernatant was passed through a filter having a pore size of 0.45 μm. The concentration of palladium ions in the aqueous solution was measured by ICP-AES. From the resulting palladium-ion concentration in the aqueous solution, the percentage of palladium ions adsorbed on the silica aggregates CXSS was calculated and found to be 92.7%. Similarly, the percentage of palladium ions adsorbed in a palladium solution that did not contain 34% seawater was measured and found to be 98.6%. The results indicated that the silica aggregates CXSS can adsorb palladium in seawater with high efficiency.

According to an embodiment of the present invention, it is possible to provide the silica aggregates that adsorb a target substance in a sufficiently high proportion from a liquid containing large amounts of impurities.

The present invention is not limited to the above-described embodiments, and various changes and modifications can be made within the spirit and scope of the present invention. Therefore, to apprise the public of the scope of the present invention the following claims are made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method for producing a silica aggregate containing primary silica particles aggregated, the method comprising:
    preparing a dispersion of primary silica particles having an average particle size of 1 nm or more and less than 10 nm;
    adding a solution containing at least one of:
        a compound represented by at least one of the following formulae (1) to (5), or
        a condensate resulting from partial hydrolysis of at least one of the compounds represented by the formulae (1) to (5),

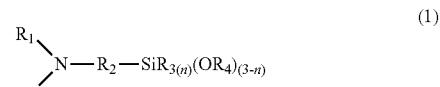

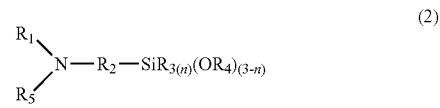

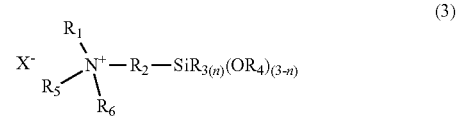

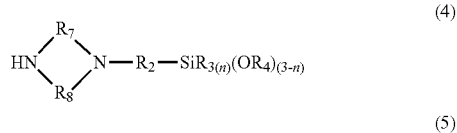

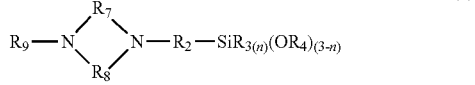

wherein $R_1$ is a hydrogen atom or a monovalent hydrocarbon group having 1 to 8 carbon atoms, $R_3$, $R_4$, $R_5$, $R_6$, and $R_9$ are each independently a monovalent hydrocarbon group having 1 to 8 carbon atoms, $R_7$ and $R_8$ are each independently a divalent hydrocarbon group, and $R_2$ is a divalent hydrocarbon group having 1 to 8 carbon atoms or a divalent group containing —NH—;
removing a dispersion medium from the dispersion; and
crosslinking the primary silica particles to each other,
wherein the silica aggregate contains aluminum oxide on at least a portion of a surface thereof.

2. A silica aggregate containing aluminum oxide on at least a portion of a surface thereof, wherein the silica aggregate is manufactured by a method comprising:
    preparing a dispersion of primary silica particles having an average particle size of 1 nm or more and less than 10 nm;
    adding a solution containing at least one of:
        a compound represented by at least one of the following formulae (1) to (5), or
        a condensate resulting from partial hydrolysis of at least one of the compounds represented by the formulae (1) to (5),

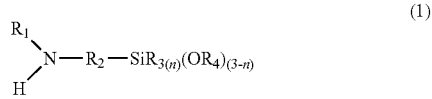

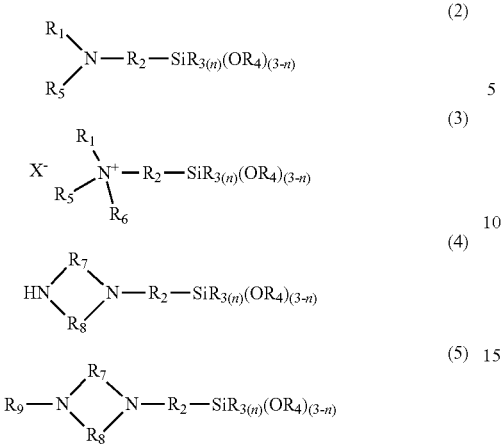

wherein $R_1$ is a hydrogen atom or a monovalent hydrocarbon group having 1 to 8 carbon atoms, $R_3$, $R_4$, $R_5$, $R_6$, and $R_9$ are each independently a monovalent hydrocarbon group having 1 to 8 carbon atoms, $R_7$ and $R_8$ are each independently a divalent hydrocarbon group, and $R_2$ is a divalent hydrocarbon group having 1 to 8 carbon atoms or a divalent group containing —NH—;

removing a dispersion medium from the dispersion; and crosslinking the primary silica particles to each other.

* * * * *